United States Patent [19]
Tamura et al.

[11] Patent Number: 5,926,930
[45] Date of Patent: Jul. 27, 1999

[54] APPARATUS FOR PRODUCING RIGID ELONGATED MEMBER FOR USE IN VEHICLES

[75] Inventors: Tatsuya Tamura; Toshio Ohkura; Yuko Kano, all of Yokohama, Japan

[73] Assignee: Hashimoto Forming Industry Co., Ltd.

[21] Appl. No.: 09/002,025

[22] Filed: Dec. 31, 1997

Related U.S. Application Data

[62] Division of application No. 08/606,936, Feb. 26, 1996, Pat. No. 5,756,167.

[30] Foreign Application Priority Data

| Apr. 7, 1995 | [JP] | Japan | 7-082946 |
| Jul. 18, 1995 | [JP] | Japan | 7-181828 |
| Sep. 26, 1995 | [JP] | Japan | 7-247366 |

[51] Int. Cl.$^6$ .................................. B21D 39/02
[52] U.S. Cl. .................. 29/33 D; 29/33 T; 29/897.2; 72/181
[58] Field of Search ................. 72/181, 182, 176, 72/368, 370.23, 370.24, 370.25; 29/897.2, 33 D, 33 T; 228/17, 17.5, 146, 173.4, 173.7

[56] References Cited

U.S. PATENT DOCUMENTS

| 3,638,465 | 2/1972 | Lickliter | 72/181 |
| 4,006,617 | 2/1977 | Foster | 72/181 |
| 4,411,103 | 10/1983 | Ohmura et al. |  |
| 4,558,577 | 12/1985 | Trishevsky | 72/181 |
| 4,838,606 | 6/1989 | Furubayashi et al. |  |
| 5,104,026 | 4/1992 | Sturrus et al. |  |
| 5,689,986 | 11/1997 | Jacobs | 72/181 |

FOREIGN PATENT DOCUMENTS

| 11-1924 | 11/1924 | Germany | 72/176 |
| 51-111462 | 10/1976 | Japan . |  |
| 51-136335 | 11/1976 | Japan . |  |
| 52-112025 | 8/1977 | Japan . |  |
| 35605 | 8/1980 | Japan . |  |
| 27722 | 2/1984 | Japan | 72/181 |
| 34689 | 2/1984 | Japan . |  |
| 59-183936 | 10/1984 | Japan . |  |
| 62-78519 | 5/1987 | Japan . |  |
| 62-179119 | 11/1987 | Japan . |  |
| 63-270223 | 11/1988 | Japan . |  |
| 2-4377 | 1/1990 | Japan . |  |
| 2-31609 | 7/1990 | Japan . |  |
| 61332 | 12/1990 | Japan . |  |
| 3-3525 | 1/1991 | Japan . |  |
| 4-238725 | 8/1992 | Japan . |  |
| 4-238726 | 8/1992 | Japan . |  |
| 4-238727 | 8/1992 | Japan . |  |
| 6-142771 | 5/1994 | Japan . |  |
| 6-142772 | 5/1994 | Japan . |  |
| 6-198344 | 7/1994 | Japan . |  |
| 6-226356 | 8/1994 | Japan . |  |
| 6-246356 | 9/1994 | Japan . |  |
| 6-246358 | 9/1994 | Japan . |  |
| 6-328145 | 11/1994 | Japan . |  |
| 6-328146 | 11/1994 | Japan . |  |
| 6-328147 | 11/1994 | Japan . |  |
| 89353 | 4/1995 | Japan . |  |
| 1454541 | 1/1989 | U.S.S.R. | 72/182 |

*Primary Examiner*—Daniel C. Crane
*Attorney, Agent, or Firm*—Oliff & Berridge, PLC

[57] ABSTRACT

An apparatus producing an elongated member having a main body portion and terminal portions extending form ends thereof includes bending an elongated strip between circumferential faces of first forming rolls and second forming rolls having parallel central rotational axes. The circumferential faces of the first forming rolls include annular main body portion bending sections that form the main body portion in the strip and adjacent transition portion bending sections that form adjacent transition portions in the strip, thereby forming an intermediate stage elongated member. The transition portions have a cross-section that changes continuously from the annular cross-section of the main body portion to a different cross-section of the terminal portions. The intermediate elongated member is further formed by annular main body portion and transition portion bending sections of the second forming rolls corresponding to the respective bending sections of the first forming rolls in circumferential length but having a different axial dimension such that the intermediate stage elongated member approaches a shape of the fully-formed elongated member.

19 Claims, 22 Drawing Sheets

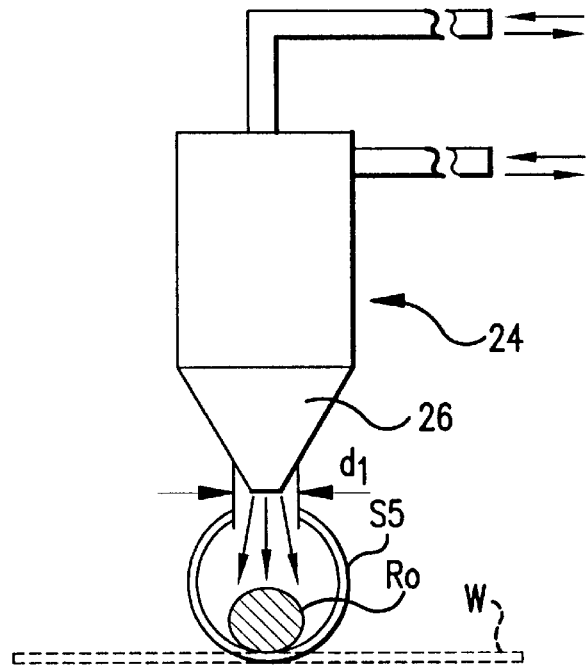
FIG.6(c)(i)
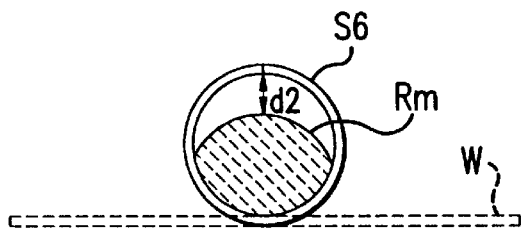
FIG.6(c)(ii)
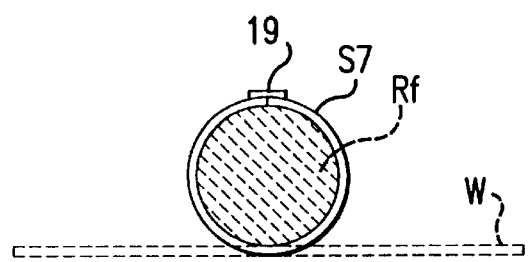
FIG.6(c)(iii)

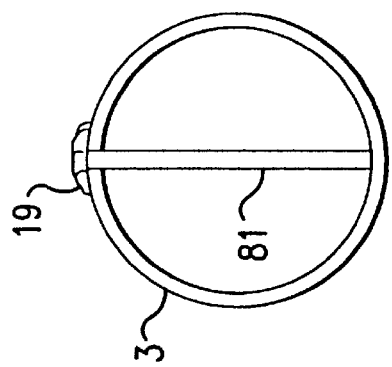
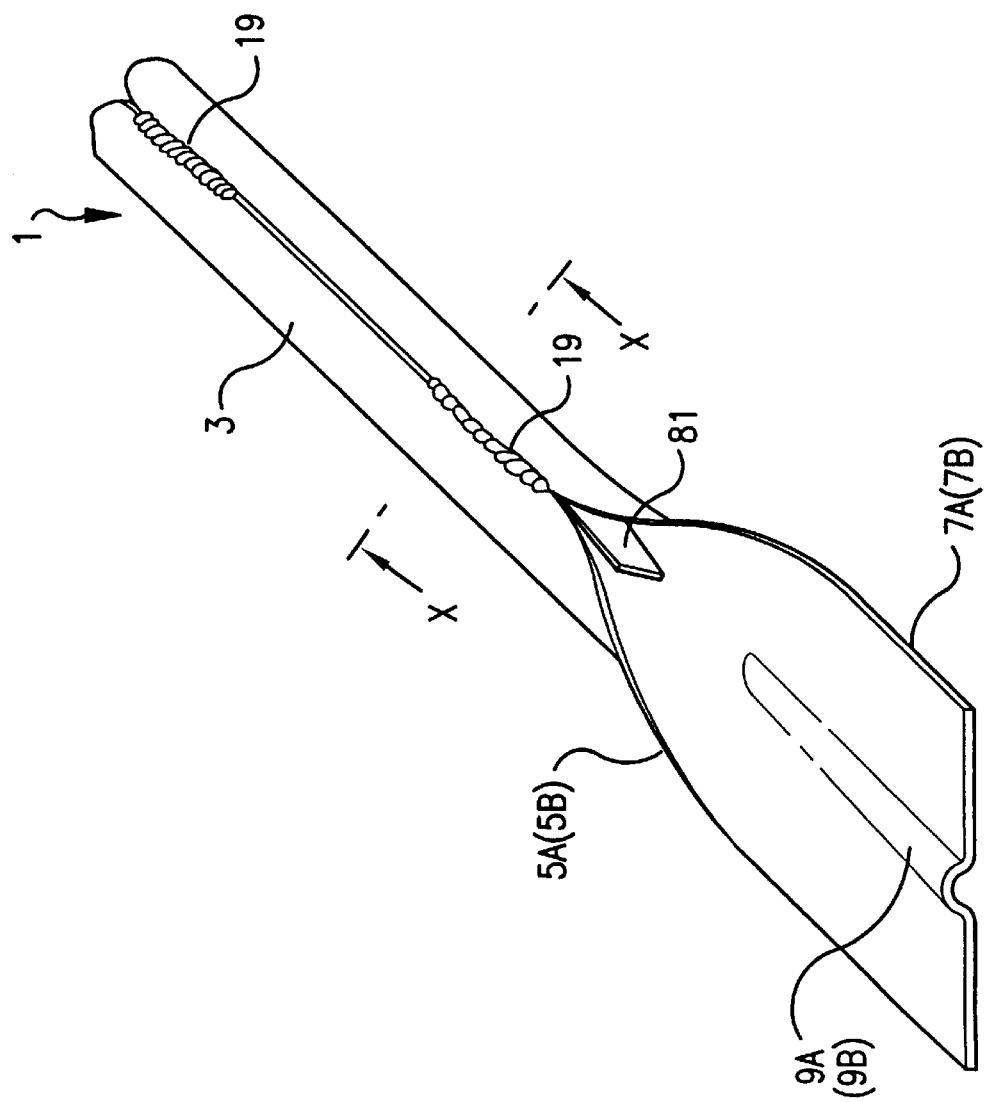
FIG.15(b)
FIG.15(a)

APPARATUS FOR PRODUCING RIGID ELONGATED MEMBER FOR USE IN VEHICLES

This is a Division of application Ser. No. 08/606,936 filed Feb. 26, 1996, now U.S. Pat. No. 5,756,167. The disclosure of the prior application is hereby incorporated by reference herein in its entirety.

BACKGROUND OF THE INVENTION

The present invention relates to a rigid elongated member, a method of producing the elongated member and an apparatus for producing the elongated member, and in particular, to an elongated member for use in vehicles in which an impact force received from a direction crossing with an axial direction of the elongated member is resisted without deformation or buckling.

As an application example of such an elongated member, there can be listed a door beam (also referred to as a guard bar) attached to an inside portion of a door and a fender of an automobile for preventing the door from significantly deforming toward a chassis to protect a passenger when the automobile is subject to a collision from the side, a bumper reinforcement (also referred to as a bumper reinforcement member, or a bumper armature) attached onto an inside face of a plastic bumper or a bumper fascia arranged at a fore and a rear of the automobile for preventing deformation of the bumper or damage of the chassis when a collision occurs, or a roof rack (also referred to as a roof rail) attached onto a roof of the automobile with a pair of left and right members along a fore and rear direction or with fore and rear members along a widthwise direction for mounting baggage thereon.

Although there are other application examples for the rigid elongated member according to the present invention, the door beam will be explained hereinafter for the representative example thereof.

As a prior example relating to the present invention, for example, there is an official gazette of JP-A-4-238725 (hereinafter referred to as the prior example).

The prior example is constructed such that a fan-shaped bracket portion with a beam portion side as a pivot is disposed on both end sides of the beam portion in which the iron band is formed in the pipe-like manner by press-forming, and an attaching portion is formed on leading end portions of the bracket portion. The attaching portion is constructed such that uneven portions are formed alternately on the leading end portion in the widthwise direction.

In the construction of the above mentioned prior example, high strength steel sheet is used, and the length of the door beam is usually about 1 m (1.5 m for the bumper reinforcement, 2 m for the roof rack). A large sized press apparatus having a capacity of about 1000 ton is required in order to press-form the door beam integrally. The press die required for working this sheet is of a transferring-in-order type (progressive die), which is expensive.

Further, since a blank process is inevitably necessary for the press-working, a waste portion results which becomes a scrap in the plate material to be used.

SUMMARY OF THE INVENTION

The present invention overcomes the problems identified above in connection with the conventional methods and apparatus.

According to the method and apparatus aspects of the present invention, the elongated member with a main body portion having an annular cross-section and terminal portions extending from the main body having a cross-section different from the annular cross-section is produced by bending an elongated strip between circumferential faces of first and second forming rolls having parallel central rotational axis. The circumferential faces of the first forming rolls include annular main body portion bending sections that form the main body portion in the strip and adjacent transition portion bending sections that form adjacent transition portions in the strip, thereby forming an intermediate stage elongated member. The transition portions have a cross-section that changes continuously from the annular cross-section of the main body portion to a different cross-section of the terminal portions. The intermediate elongated member is further formed by annular main body portion and transition portion bending sections of the second forming rolls, which correspond to the respective bending sections of the first forming rolls in circumferential length but have a different axial dimension, such that the intermediate stage elongated member approaches a shape of the fully formed elongated member.

Further, the elongated member can be at least partially filled with resin to increase the strength and rigidity of the elongated member. In addition, side rolls can be provided in addition to the forming rolls such that the elongated member is subjected to forces from more than one direction during the forming process.

BRIEF DESCRIPTION OF THE DRAWINGS

A complete understanding of the present invention may be obtained by reference to the accompanying drawings, when considered in conjunction with the subsequent detailed description thereof, in which:

FIGS. 6(c)(i), 6(c)(ii) and 6(c)(iii) are enlarged views taken along lines VI(c)(i)—VI(c)(i), VI(c)(ii)—VI(c)(ii) and VI(c)(iii)—VI(c)(iii), respectively, of FIG. 6(b) showing the operation of one aspect of the production apparatus;

FIGS. 15(*a*) and 15(*b*) are explanatory views showing additional embodiments of the center main body portion of the door beam;

DETAILED DESCRIPTION OF PREFERRED EMBODIMENTS

Figure 1A:
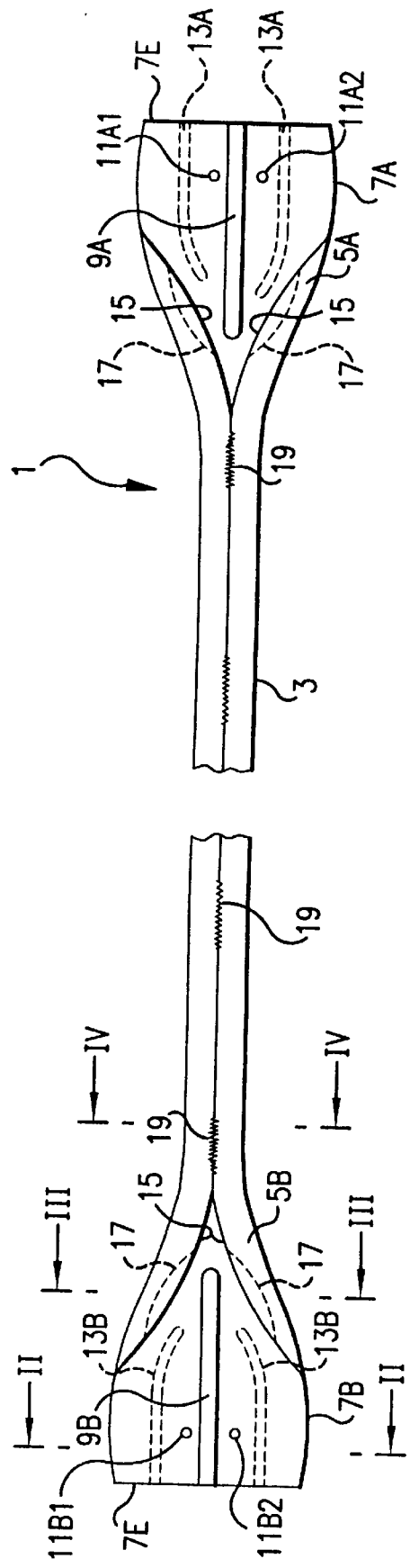
FIGS. 1(a) and 1(b) are plan views of door beams according to different embodiments of the present invention.

According to one embodiment of the present invention, an elongated member has a main body portion with a substantially annular cross-section and terminal portions extending from ends of the main body portion having a different cross-section. The terminal portions include transition portions having a cross-section that changes continuously from the substantially annular cross-section to the different cross-section along a longitudinal axis from the main body portion to each of the terminal portions. The member is formed by bending an elongated strip.

In a first step of bending, the elongated strip is fed between circumferential faces of first forming rolls having parallel central rotational axes to partially form the main body portion and the transition portions by synchronously rotating the first forming rolls to successively engage the strip with annular main body portion bending sections and adjacent transition portion bending sections of the first forming rolls, thereby continuously forming an intermediate stage elongated member.

In a second step of bending, the intermediate stage elongated member is fed between circumferential faces of second forming rolls having parallel central rotational axes by synchronously rotating the second forming rolls to successively engage annular main body portion bending sections and adjacent transition portion bending sections of the second forming rolls corresponding to the respective bending sections of the first forming rolls in circumferential length but having a different axial dimension such that the intermediate stage elongated member approaches a shape of the elongated member.

Therefore, because the elongated member passes through between the outer circumferential faces of the first forming rolls which form a pair, the portion thereof to be worked is worked so as to shift timewise along the longitudinal direction (i.e., the total length thereof with respect to the longitudinal direction is worked simultaneously at the same time period). Also, because the elongated member passes through and is incrementally worked by a plurality of succeeding pairs of forming rolls, such as the second pair, the third pair, etc., the severe effects of single-stage press working can be prevented.

Preferably, at least one of the first and second steps of bending includes engaging the intermediate stage elongated member with bending sections of the at least one pair of synchronously rotating side rolls having central rotational axes that intersect the rotational axes of the first and second forming rolls such that the bending sections exert force upon and bend opposite sides of the intermediate elongated member.

Therefore, because a side forming roll is used, and the shaft thereof is disposed at an angle with respect to the shaft of the forming rolls, the material can be bending-worked by applying forces from many directions to ensure the effectiveness of the bending-working operation.

Preferably, the step of engaging includes engaging the main body portion with annular shaped bending sections of the at least one pair of side rolls. The step of engaging preferably includes engaging side rolls having rotational axes that are approximately perpendicular to the central rotational axes of the first and second forming rolls.

The method preferably includes separating the elongated member from a next elongated member at a point between one terminal portion of the elongated member and an adjacent terminal portion of the next elongated member. Therefore, because continuous strip material is used, the productivity of the method is high. In addition, the method preferably includes joining opposite side edges of the elongated member to each other along at least a portion of the main body section. Therefore, the elongated member having a high bending strength can be produced while high productivity is maintained.

Preferably, the first step of bending includes bending an elongated strip having a constant width. Therefore, no waste of the strip material occurs (i.e., no scraps are produced), and production continues while the raw plate of wide width high strength steel sheet remains to be slit to a constant width.

Further, the first step of bending preferably includes slitting the strip to a predetermined shape. Therefore, the elongated member having an attaching portion wider than the external form of the center main body portion is produced, and where the elongated member is attached by spot welding, the number of the spot welds can be increased.

The method preferably includes bending the elongated member along the longitudinal axis into an arc. Therefore, an elongated member applicable for a bumper reinforcement and a roof rack (roof rail) is produced. In addition, the method preferably includes supplying foaming resin to an internal side of the intermediate elongated member before the main body portion is completely formed.

The step of supplying the resin preferably includes maintaining a clearance between the resin and an inner surface of the main body portion. Preferably, the step of supplying the resin includes supplying the resin such that a cross-section of the resin being supplied is rounded. Alternatively, the step of supplying the resin includes supplying the resin such that a cross-section of the supplied resin becomes rounded.

Alternatively, the step of supplying the resin includes supplying the resin such that a cross-section of the resin remains rounded.

Preferably, the first and second steps of bending include respectively engaging the strip and intermediate elongated member with main body portion forming sections having a first radial bending dimension and transition portion forming sections having a second radial bending dimension distinct from the first radial bending dimension.

An apparatus for forming the elongated member includes a first bending system for bending an elongated strip with circumferential faces of first forming rolls having parallel central rotational axes. The first bending system includes first annular main body portion bending sections and adjacent first transition portion bending sections that partially bend the strip into an intermediate stage elongated member. In addition, the apparatus includes a second bending system for bending the intermediate stage elongated member with circumferential faces of second forming rolls having parallel rotational axes. The second bending system includes second annular main body portion bending sections and adjacent second transition portion bending sections corresponding to the respective first sections of the first forming rolls in circumferential length but having a different axial dimension to bend the intermediate stage elongated member such that the intermediate stage elongated member approaches a shape of the elongated member.

Preferably, the first and second bending systems are coupled together such that the first forming rolls rotate at a first rotational speed and the second forming rolls rotate at a second rotational speed substantially equal to said first rotational speed.

The apparatus preferably includes at least one pair of side rolls disposed downstream of at least the first forming rolls and rotatable about axes intersecting the central rotational axes of the first and second forming rolls, wherein the side rolls include contact sections engageable with the intermediate stage elongated member to guide and to further form the intermediate stage elongated member. Preferably, the axes of the side rolls are approximately perpendicular to the central rotational axes of the first and second forming rolls such that forces in perpendicular directions are exerted on the intermediate stage elongated member. Therefore, sufficient bending-working occurs because the strip material is formed by forces from many directions.

Preferably, the at least one pair of side rolls is a first pair and the apparatus includes at least one additional pair of side rolls disposed downstream of a succeeding pair of forming rolls. Preferably, the contact sections include annular bending sections to further form the main body portion of the intermediate stage elongated member. The annular bending sections preferably extend completely around each of the at least one pair of side rolls. The contact sections preferably include transition portion contact sections and terminal portion contact sections.

Preferably, a diameter of the second forming rolls is slightly larger than a diameter of the first forming rolls. Preferably, the apparatus includes pairs of succeeding forming rolls disposed downstream of the second forming rolls in which a diameter of each of a first pair of succeeding forming rolls is greater than the diameter of each of the second forming rolls, and wherein the diameter of each roll of each subsequent pair of succeeding forming rolls is greater than a diameter of each roll of the preceding pair of succeeding forming rolls. Therefore, because the circumferential speed of the succeeding rolls increases slightly over that of the preceding rolls, tension on the strip material in the longitudinal direction is maintained during the working. As a result, the strip is prevented from bending between the adjacent forming rolls.

Preferably, a phase angle difference between a phase angle of the first forming rolls and a phase angle of the second forming rolls is $\Theta$, a diameter of the second forming rolls is d, and the second forming rolls are separated from the first forming rolls by a distance L such that $L=\pi d\Theta/360°$. Therefore, when the strip material is moved downstream while being worked, the working position of the succeeding forming rolls is aligned with the position of the strip material to be worked.

Preferably, the apparatus includes a welder for welding side edges of the elongated member to each other along at least a portion of the main body portion. Further, the apparatus preferably includes a separating apparatus for separating the elongated member from a next elongated member at a point between one terminal portion of the elongated member and an adjacent terminal portion of the next elongated member. Therefore, because continuous strip material is used, the productivity of the method is high.

Preferably, the apparatus includes a width changing apparatus for changing a width of the strip in a longitudinal direction disposed upstream of the first forming rolls. Further, the apparatus preferably includes a bender for bending the elongated member along the longitudinal axis into an arc. In addition, the apparatus preferably includes a resin supply apparatus for supplying foaming resin to an internal side of the intermediate stage elongated member before the main body portion is completely formed.

The first and second forming rolls preferably include main body portion forming sections having a first radial bending dimension and transition portion forming sections having a second radial bending dimension distinct from the first radial bending dimension. Preferably, the pairs of first and second forming rolls each include a respective female roll and a respective mating male roll, each female roll including a circumferential groove to receive a corresponding circumferential protuberance of the respective mating male roll, and wherein a radial distance between each circumferential groove and a center of the respective female roll and a radial distance between each circumferential protuberance and a center of the respective male roll is nonuniform for points about the respective centers of each female and male roll.

An elongated member produced according to the method preferably includes a main body portion defining a longitudinal axis and formed of flat strip material by roll forming to have a substantially annular cross-section and terminal portions extending from ends of the main body portion having a different cross-section. The terminal portions include transition portions having a cross-section formed by roll forming to change continuously from the substantially annular cross-section to the different cross-section along the longitudinal axis from the main body portion to each of the terminal portions. The terminal portions have ends with a width substantially equal to a width of the flat strip.

Therefore, because the whole elongated member is an integral construction (i.e., formed as a single piece), welding the separate attaching bracket and the like is unnecessary, and thus the attaching bracket does not separate from the member when it is loaded. Also, since the transition from the center main body portion to the terminal attaching portion is smooth, continuous and gradual, there is no stress-concentrated portion over the total length, even when the load is added onto the main body portion, so that a stable strength is obtained.

Preferably, a developed width (i.e., the width of the strip transverse to the longitudinal direction when the strip is unrolled and laid flat) of the main body portion is substantially equal to a developed width of the ends of the terminal portions. Therefore, the strip material becomes the same in width over the total length, and the tensile strength becomes the same over the total length. Also, the material is used efficiently when produced (i.e., no waste scraps are produced).

Alternatively, a developed width of the ends of the terminal portions may be greater than a developed width of the main body portion, and a developed width of the transition portions changes continuously between the developed width of the ends of the terminal portions and developed width of the main body portion. Therefore, the width of the attaching portion is wide compared with the external form of the center main body portion. As a result, a broad area for the attaching portion can be provided so that the attaching strength can be improved (for example, the number of the spot welds can be increased). Since the external form of the center portion can be made small compared to the width of the attaching portion, interference with other structure inside the door can be prevented when the invention is used as a door beam, etc. Providing such an elongated member by a press process, which is distinct from the roll forming process of the claimed invention, is difficult.

Preferably, the opposite sides of the strip material formed into the main body portion are opposed to each other. Therefore, because the bending strength is increased, bending and buckling of the elongated member are avoided even when the bending load is applied to the elongated member. Alternatively, the opposite sides of the strip material formed into the main body portion may overlap each other. Further, the opposite side edges of the strip material formed into the main body portion are preferably joined to each other. Therefore, the rigidity of the center main body can be increased and the bending strength can be improved.

Preferably, one side of the strip material formed into the main body portion includes a reinforcing rib. Therefore, because the reinforcing rib is formed as part of the beam, the bending strength is further improved even when the bending load is exerted on the beam in the widthwise direction. Alternatively, opposite sides of the strip material formed into the main body portion may include reinforcing rib portions that project into an annular space of the main body portion. Therefore, the width of the terminal attaching portion can be increased compared with the external form of the center main body portion, and the bending strength can be improved. Alternatively, the elongated member may include a separate reinforcing rib member attached to the main body portion parallel to the longitudinal axis. Therefore, because the center main body portion is substantially pipe-like, the forming-working can be performed easily and the bending strength can be improved.

Preferably, the elongated member is symmetrical with respect to a direction transverse of the longitudinal axis. Therefore, the elongated member can be used interchangeably for the left and right sides of the chassis. As a result, production costs decrease because separate forming dies are unnecessary. Preferably, the longitudinal axis is a substantially straight line. Alternatively, the longitudinal axis is bent in an arc.

Preferably, the strip material is at least as great 0.8 mm and not greater than 2.4 mm in thickness and at least as great as 50 kgf/mm$^2$ in tensile strength. Therefore, a material having a plate thickness thinner than typical cold rolled steel sheet can be used for obtaining a predetermined bending strength. As a result, the weight of the member and the amount of required material are reduced. Because the working is performed by roll-forming even if the material is a high strength steel sheet, the strain after forming is reduced compared with the case of press-working, which thus improves productivity.

Preferably, at least the main body portion is at least partially filled with resin. Preferably, the resin includes added rigid reinforcing material, such as glass fiber (short fiber), glass flake, potassium titanate fiber (short fiber), milled fiber, mica, silica, wollastonite, mineral fiber and the like, in amounts from 30 to 50 weight percent.

Referring to FIGS. 1(*a*) and 1(*b*), a door beam 1 as one example of a rigid elongated member for use in vehicles according to a first embodiment of a product is provided with a pipe-like center main body portion 3 at a center portion with respect to a longitudinal direction. Both end sides of the center main body portion 3 are provided with lateral sectional shape changing portions 5A, 5B which change gradually in lateral sectional shape from a tubular manner to flat a plate-like manner. It is preferable in the practical use that the door beam 1 is obtained by roll-forming a strip material of a high strength steel sheet having a strength of not less than 50 kgf/mm$^2$ in tensile strength, and is greater than 0.8 mm and not greater than 2.4 mm in thickness of plate. It is most preferable in practical use that the thickness of plate is within a range of 1.2 mm to 2.0 mm, and that the tensile strength is a range of 100 to 160 Mg/mm$^2$. The lateral sectional shape changing portions 5A, 5B are included, and at further end portion sides thereof are disposed terminal attaching portions 7A, 7B for attaching portions of a door panel (not shown).

According to an alternative embodiment shown in FIG. 1(*b*), at least a portion of the center main body portion 3 of the door beam 1 is filled with a foaming hard synthetic resin 8. Although not shown in FIG. 1(*b*), the resin 8 can extend further outward through at least the lateral sectional shape changing portions.

Moreover, the lateral sectional shape changing portions 5A, 5B may be used as the terminal attaching portions. However, in this embodiment, an explanation will be provided that the terminal attaching portions 7A, 7B include the lateral sectional shape changing portions 5A, 5B, continuously extending therefrom and that the terminal attaching portions 7A, 7B are formed at the end portion side thereof.

The above mentioned terminal attaching portions 7A, 7B are shaped substantially flat. In this embodiment, as shown in FIGS. 1(*a*), 1(*b*) and 2, reinforcing ribs 9A, 9B are formed along the longitudinal direction and positioning holes 11A1, 11A2; 11B1, 11B2 for ensuring an accurate attaching position at the time of attaching to the chassis are formed.

The above mentioned ribs 9A, 9B are formed so as to protrude to the opposite side of an attaching face 7F at widthwise center portions of the terminal attaching portions 7A, 7B, in the embodiment. And the length of the ribs 9A, 9B is formed over the region from the end portion 7E of the terminal attaching portions 7A, 7B to the lateral sectional shape changing portions 5A, 5B.

The positioning holes 11A1, 11A2; 11B1, 11B2 are disposed at positions spaced apart by predetermined dimensions from the end 7E of the terminal attaching portions 7A, 7B symmetrically with the ribs 9A, 9B as a center. The positioning holes 11A1, 11A2; 11B1, 11B2 realize the function of positioning the door beam 1 to the attaching portion accurately by, when the door beam 1 is attached to the attaching portion of the door panel, ensuring engagement with small positioning protrusions, such as dowels, disposed on the above mentioned attaching portion.

Moreover, in this embodiment, there is exemplified the construction in which the ribs 9A, 9B are formed on widthwise center portions of the terminal attaching portions 7A, 7B. However, since these ribs 9A, 9B are determined based on the required strength of the terminal attaching portions 7A, 7B, there is a case in which they are unnecessary. Conversely speaking, the number of the ribs needs not be limited to one, for example, the ribs 13A, 13B of appropriate length can be also added appropriately as shown by an imaginary line in FIGS. 1(a) and 1(b).

The lateral sectional shape changing portions 5A, 5B are shaped in a substantial groove in which a lateral sectional shape, in which both side edges of an elongated flat plate (strip material) are rounded into an arc, has an opening. The lateral sectional shape thereof in a side of the center main body portion 3 is shaped in substantial pipe of the same shape. The sectional shape of the pipe is changed smoothly, continuously and gradually in such a substantially groove-like manner that the pipe opens gradually towards the side of the terminal attaching portions 7A, 7B.

That is, the lateral sectional shape changing portions 5A, 5B are portions which connect the flat plate-like terminal attaching portions 7A, 7B and the pipe-like center main body portion 3 by a curved face so as not to cause a problem such as a stress concentration due to a notch effect. Moreover, in a case where cracking is apt to be caused due to the tensile strength at edge portions of the lateral sectional shape changing portions 5A, 5B when both sides of the elongated flat plate are formed in an arc to be gradually formed in a pipe-like manner, it is preferable to cut previously a portion 15 enlarging in deformation (elongation), into such a shape to continue smoothly at a portion of a cutting line 17.

Figure 4:
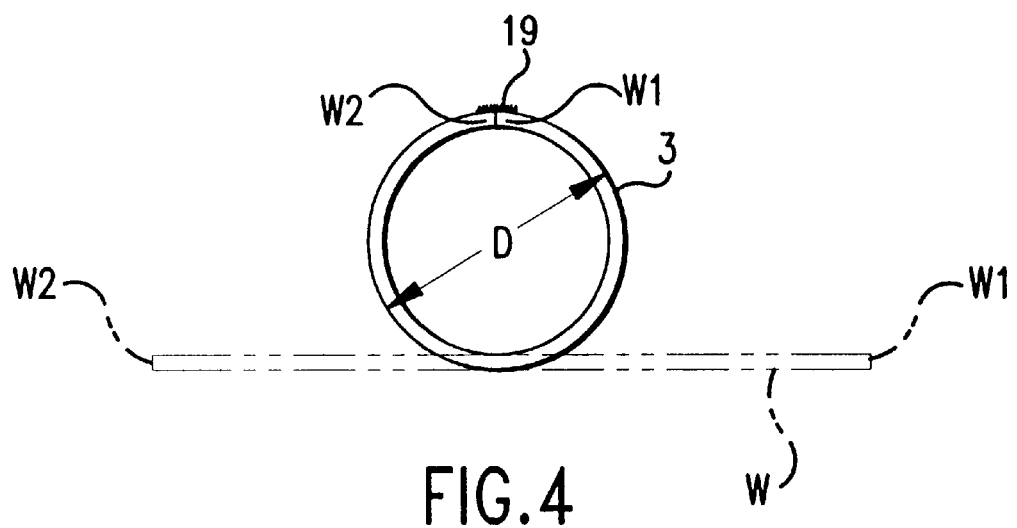
FIG. 4 is an enlarged sectional view taken along the line IV—IV of FIG. 1(a)

As shown in FIG. 4, the center main body portion 3 has such a shape that the elongated flat plate W is rounded in a pipe having a diameter D (strictly speaking, although the diameter D is a center of thickness of plate, it represents an outer diameter for convenience). The side edges $W_1$, $W_2$ of the above mentioned flat plate W are opposed to be butted and jointed to each other, and the joint portions are united integrally by a welded portion 19 formed by an arc welding in which metal lines are supplied, and the like. On this occasion, the width of the flat plate W becomes $\pi D$, and the diameter D is determined by the width of the flat plate W.

It is preferable that the above mentioned welded portion 19 is disposed over the overall length of the center main body portion 3 in order to prevent the side edges $W_1$, $W_2$ from opening and to improve a sectional rigidity. But, partial welding is allowable considering the required strength and the producing cost. In this case, it is preferable to weld the joint portion of a transitional portion from one part of the center portion 3 and the lateral sectional shape changing portions 5A, 5B to the center main body portion 3.

However, whether the welded portion 19 is necessary is determined based on the required strength. There is a case that the welded portion 19 is unnecessary when steel having a relatively thick thickness of plate (for example, about 2.0 mm) and high tensile strength (100 kgf/mm$^2$ to 160 kgf/mm$^2$) is used as the high strength steel of the door beam 1.

As understood already, the door beam 1 according to this embodiment is formed by the elongated flat plate which is a strip material in which a cold-rolled material plate of high strength steel having a wide width is slit at a predetermined width along a rolling direction. Accordingly, if the welded portion 19 is removed and the door beam is developed in a flat plate manner, the door beam 1 is formed in a rectangle having the same width along the longitudinal direction. Moreover, in a case where the portion 15 is cut as described above, a portion of the rectangle corresponding to the portion 15 is shaped in a concave manner.

Figure 1B:
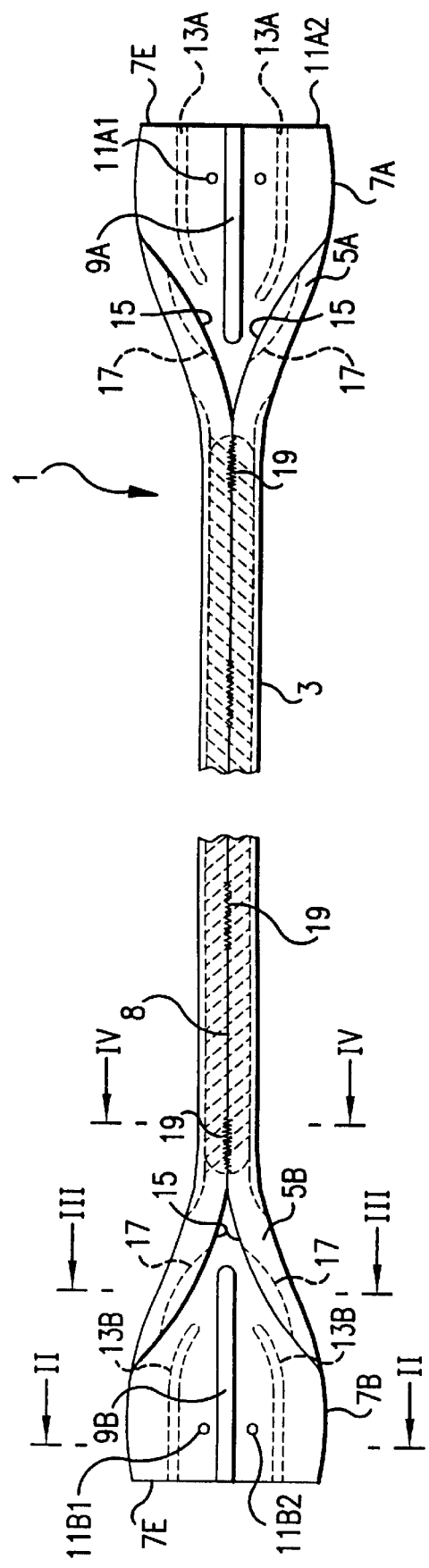
Figure 2:
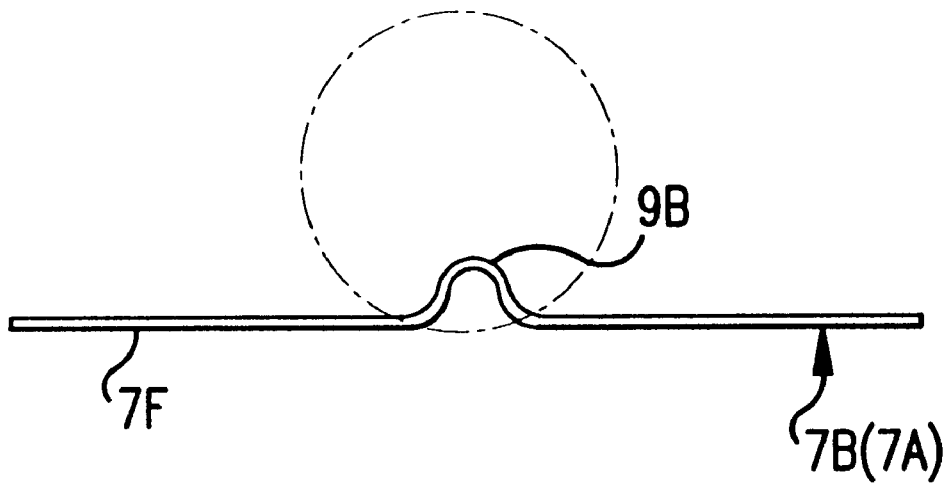
FIG. 2 is an enlarged sectional view taken along the line II—II of FIG. 1(a)
Figure 3:
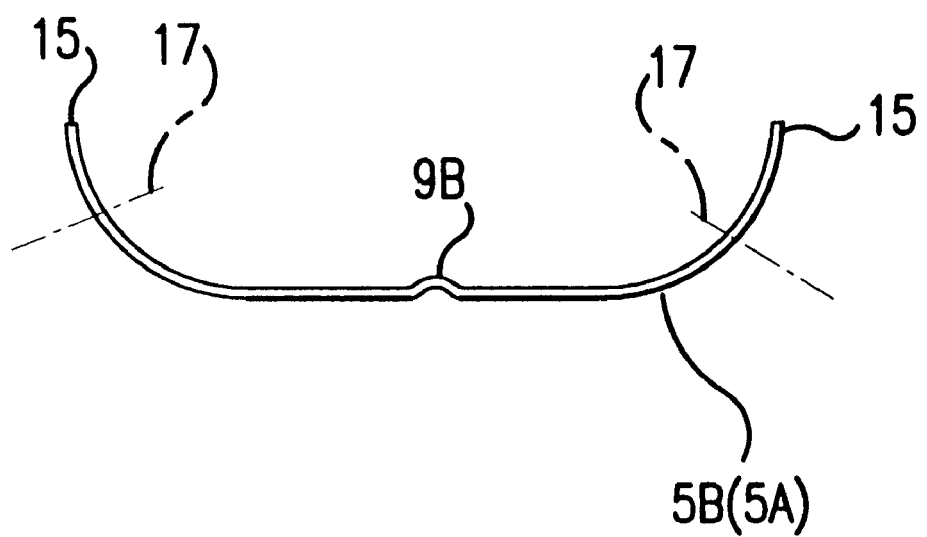
FIG. 3 is an enlarged sectional view taken along the line III—III of FIG. 1(a)

Also, as apparent from FIGS. 1(a) and 1(b), since the door beam 1 is formed into a symmetrical shape with the center with respect to the longitudinal direction as a symmetrical center, it can be used commonly for the left and right door panels. Thereby, both of left and right members can be molded by one mold described later, so that the cost of the mold is decreased.

Figure 5:
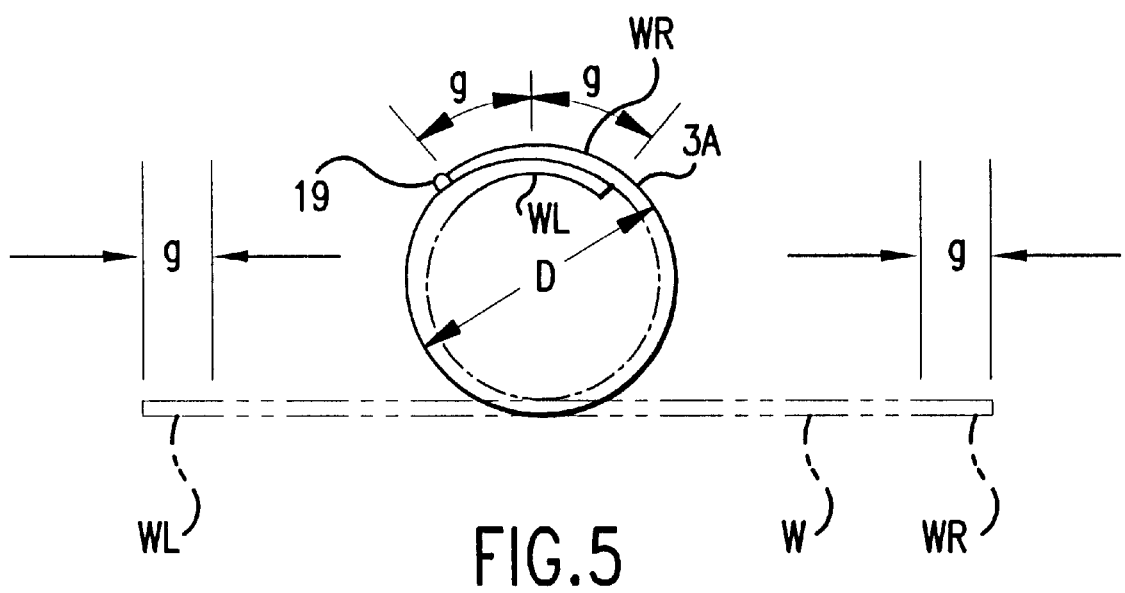
FIG. 5 is a enlarged sectional view similar to FIG. 4 showing another embodiment of a center main body portion.

FIG. 5 is a lateral sectional view of the center main body portion 3 of the door beam according to another embodiment of the product. In this embodiment, the center main body portion 3 is formed in a pipe-like manner in which the side edge portions WR, WL of the flat plate W are overlapped with each other, and united integrally at the welded portion 19 similarly to the previous embodiments.

This embodiment of the product is effective in a case where it is necessary that the diameter D of a center main body portion 3 is maintained at a constant and the width of the terminal attaching portion is made large. Moreover, in this case, the width of the flat plate W becomes ($\pi D+2g$), so that the flat plate W which is wider by 2g than the flat plate W of the second embodiment of the product is used. Thereby, the number of spot welding locations and the like for improving the attaching strength to the chassis described later can be increased. Also, in the intermediate portion in the longitudinal direction of the center main body portion 3, the diameter D can be enlarged at the intermediate portion by reducing the overlapped portion of the side edge portions WR, WL more than at other portions of the center main body portion 3, so that the bending strength can be improved.

When the center main body portion of the door beam is formed in the pipe-like manner, as described above, the construction in which the side edge portions WR, WL of the flat plate are overlapped with each other is realized, so that the bending strength can be improved due to the overlapping, the diameter D of the center main body portion can be decreased compared with the width of the flat plate, and in spite of the small diameter, the attaching strength can be improved.

Figure 6A:
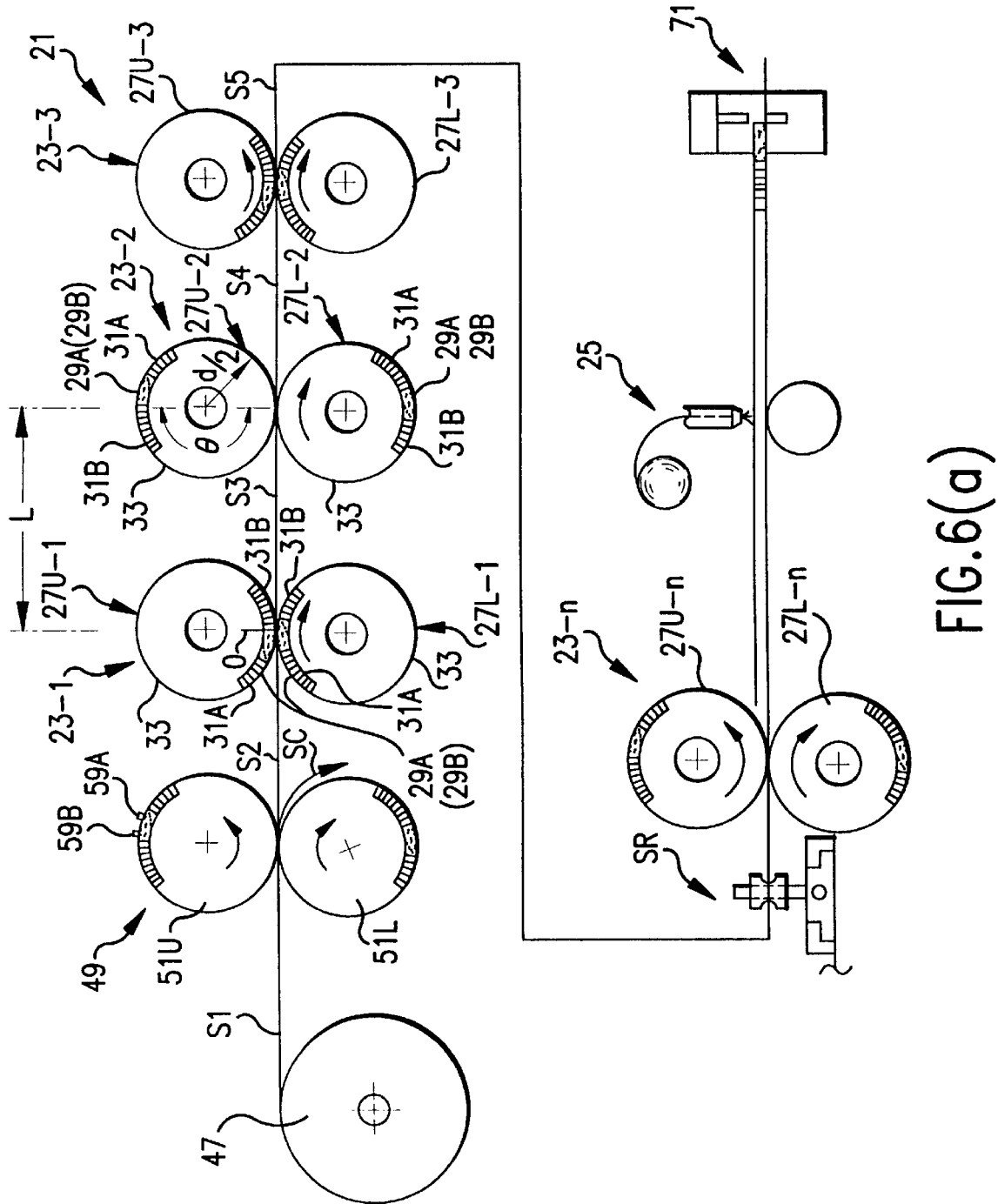
FIGS. 6(a) and 6(b) are explanatory views of production apparatus according to different embodiments of the present invention.
Figure 6B:
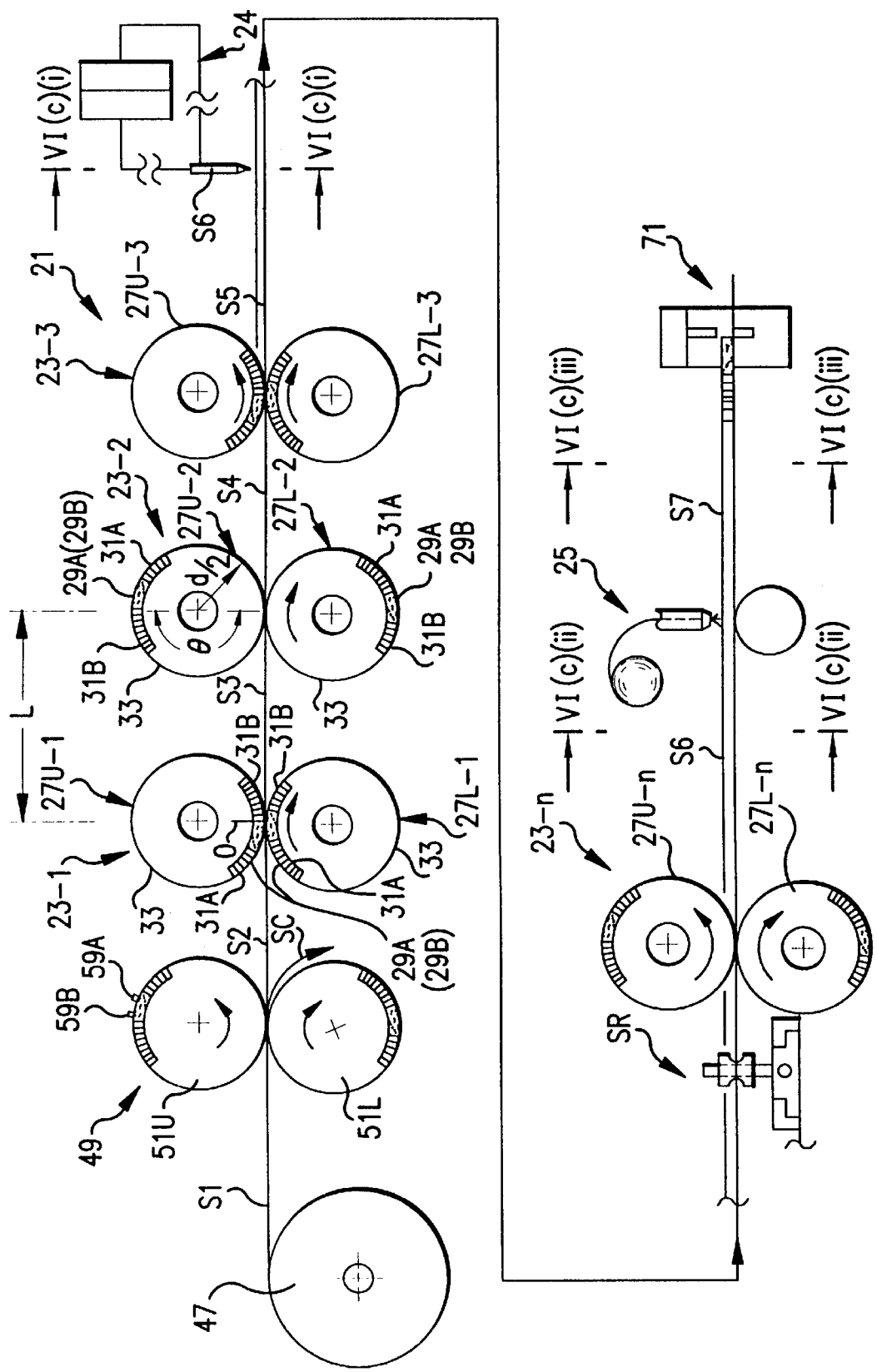

FIGS. 6(a) and 6(b) show embodiments of a producing apparatus for producing the door beam 1 and associated production methods.

As shown in FIG. 6(a), a door beam producing apparatus 21 for use in vehicles is configured in such a manner that a plurality of pairs of a first, a second, . . . , and an n-th pair of forming rolls 23-1, 23-2, . . . , 23-n which are rotated and driven at the substantially same rotational speed by a driving apparatus described later, respectively, are arranged in line. The rolls on and after the second pair of the forming rolls are generally called succeeding forming rolls. A welding apparatus 25 is disposed at a downstream side of the above mentioned group of the succeeding forming rolls, and further a running and cutting off apparatus 71 is disposed downstream of the welding apparatus 25.

As shown in FIG. 6(b) in particular, a resin supply apparatus 24 for supplying the resin 8 for the door beam of FIG. 1(b) is shown. In FIG. 6(b), the resin supply apparatus 24 is positioned downstream from the third pair of forming rolls 23-3. Alternatively, the resin supply apparatus 24 can be positioned between any of the succeeding forming rolls.

That is, a door beam producing apparatus 21 for use in vehicles according to this embodiment is adapted to ensure that an elongated flat plate (strip material) S1 is formed by bending-working (hereinafter referred to as bending) in an arc-like sectional manner along a longitudinal direction by roll-forming. Accordingly, the elongated flat plate is forming-worked gradually by transferring and supplying continuously the flat plate from the first forming rolls 23-1 in the upstream side to the forming rolls 23-2, . . . , 23-n in the downstream side, to the welding apparatus 25 in a shape of the door beam 1, to the necessary welding operation, and further to the cutting operation for cutting at predetermined lengths at predetermined positions.

Each of the first, the second, . . . , the n-th forming rolls 23-1, 23-2, . . . , 23-n comprise upper rolls (male rolls) 27U-1, 27U-2, . . . , 27U-n and lower rolls (female rolls) 27L-1, 27L-2, . . . , 27L-n which form a pair. Of course, the relative upper and lower positions of the respective male and female rolls could be reversed if desired.

In the embodiment shown in FIG. 6(b), an inner side of the elongated plate is also filled with liquid synthetic resin supplied from a nozzle 26 of a resin supply apparatus 24. The resin supply apparatus 24 is positioned at a point in the process in which sufficient space in the elongated plate for receiving the resin 8 still exists before further forming occurs.

As shown in detail in FIGS. 6(b), 6(c)(i), 6(c)(ii) and 6(c)(iii), at a point where a space between the edges of the elongated plate equivalent to a dimension d1 (at stage S-5) remains open, the resin supply apparatus 24 discharges an appropriate quantity of foaming resin $R_0$ through the nozzle 26 into and along the length of the elongated plate. The foaming process is carried out by heat created by reaction between the resin components and/or separate heating. As shown in FIG. 6(c)(ii), an interior section of the central main body portion is gradually filled to the extent represented by an intermediate stage of the resin $R_m$ as the elongated plate moves downstream from the stage S5.

Preferably, the intermediate resin $R_m$ remains separated from the interior surface of the elongated plate by a distance $d_2$ at the time of welding. The heat created when the central main body portion 3 is welded is transmitted to the resin, which accelerates the foaming process.

The foaming resin $R_0$ is preferably one that hardens after the foaming process into a hard synthetic resin Rf (see FIG. 6(c)(iii)) having superior mechanical strength. Rigidity supporting material, including glass fiber (short fiber), glass flake, potassium titanate fiber (short fiber), milled fiber, mica, silica, wollastonite, mineral fiber and the like, can be added to the foaming resin $R_0$ in amounts from 30 to 50 weight percent to improve the rigidity of the hard synthetic resin Rf. For example, a primary material such as [sumijule] 44V20, or SBU [Isocyanate] 0389, [Sumiphen] TS, or SBU [Polyol] H460 and the like, manufactured by Sumitomo Bayer Urethan K.K., can be used as the foaming resin $R_0$ to obtain foaming polyurethane in a hard form.

The resin supply apparatus 24 adjusts the temperature of each resin material and the supply quantity of the resin. The resin supply apparatus 24 also mixes the resin. In addition, the resin supply apparatus 24 begins and ends discharge of the resin in accordance with predetermined discharge and supply timing by detecting the end section 7E of the door beam 1, the positioning holes 11A1 or 11A2, or the point 5A where the cross-sectional shape of the central main body portion 3 changes. To fulfill this function, the resin supply apparatus 24 may include a detector (not shown), such as a magnetic sensor, an optical sensor, an image sensor or the like. The resin filling process is carried out over a predetermined distance, for a predetermined time, or while predetermined conditions exist.

Figure 7:
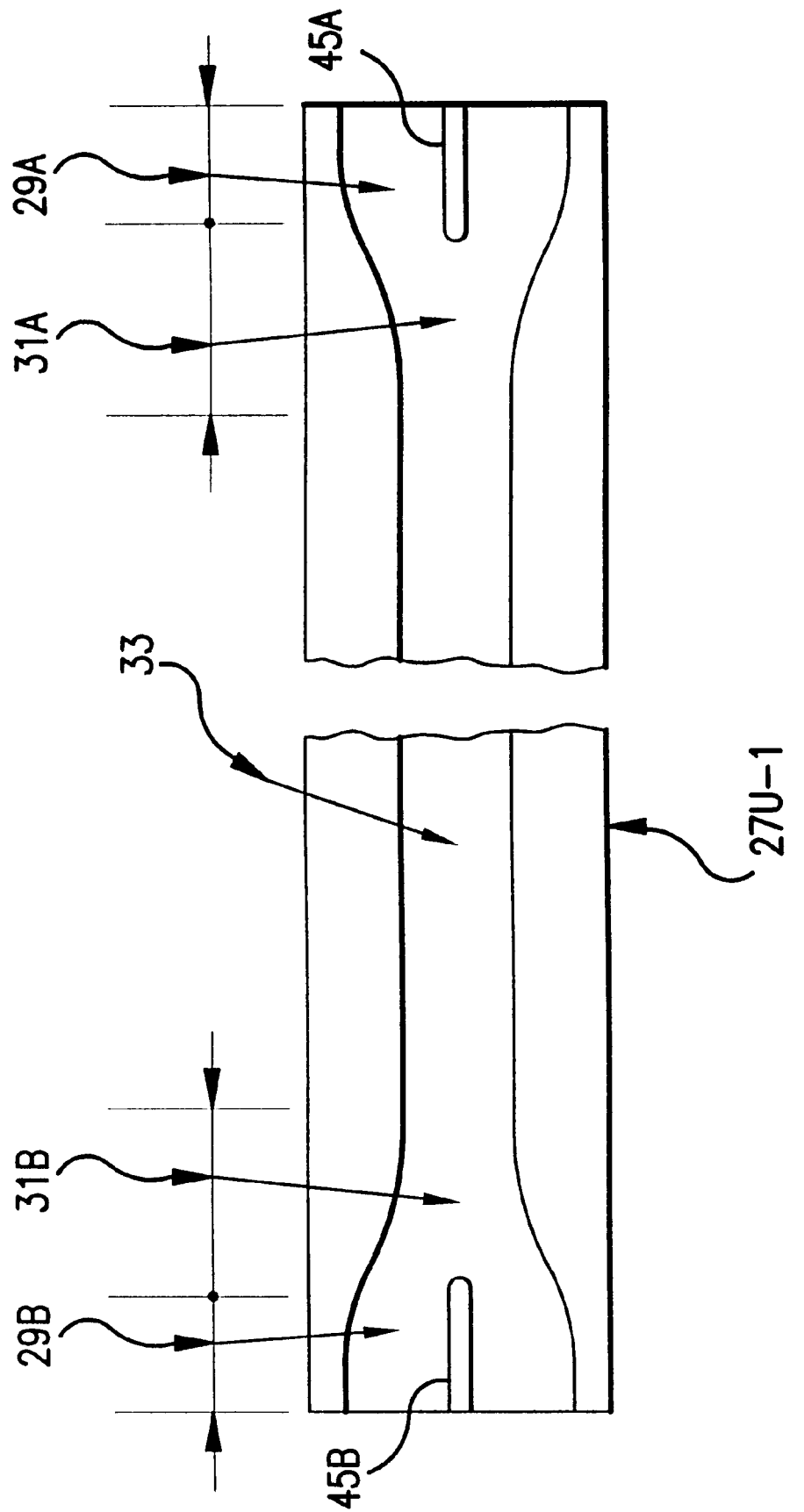
FIG. 7 is an explanatory view showing a conceptually developed view of a forming roll.

For the respective upper and lower rolls 27U-1, 27L-1, . . . , 27U-n, 27L-n of the above mentioned respective forming rolls 23-1, 23-2, . . . , 23-n, FIG. 7 shows a schematic developed view in which a shape of a bending working face of an outer periphery of the circular forming roll 27U-1 is developed in the flat plate-like manner for convenience.

In the drawing, there are constructed attaching portion forming-working portion 29A, 29B, lateral sectional shape changing portion forming-working portions 31A, 31B and a center main body portion forming-working portion 33 on the door beam 1 for use in the vehicles. Incidentally, in the same drawing, longitudinal directionwise ends 29A and 29B are at the same position with each other in the actual first forming roll 27U-1.

The attaching forming-working portion 29A, 29B is for forming-working portions corresponding to the terminal attaching portions 7A, 7B. The lateral sectional shape changing portion forming-working portion 31A, 31B is for bending forming-working portions corresponding to the lateral sectional shape changing portions 5A, 5B in such a manner that the lateral sectional shape changes gradually so as to connect the terminal attaching portions 7A, 7B and the center main body portion 3 by a smooth curved face. The center main body portion forming-working portion 33 is for forming-working a portion corresponding to the center main body portion 3 into a pipe having a constant annular lateral section.

Moreover, in FIG. 7, the upper roll 27U-1 on the first forming roll 23-1 is developed and exemplified schematically. The roll-forming is to forming-work the plate material gradually into a shape of the product by transferring and supplying the plate material from the upstream forming roll 23-1 to the downstream forming rolls 23-3, . . . , 23-n. Therefore, each of forming-working portions on the respective forming rolls 23-1, . . . , 23-n has substantially the same dimension and shape corresponding to the first forming roll 23-1 with respect to the longitudinal direction, that is the circumferential directions. The dimension and the shape are changed into the shape close to the final shape of the door beam 1 with respect to the axial direction of the forming roll.

In the construction of the forming rolls 23-1, . . . , 23-n, respective dimensions and shapes of the above mentioned forming-working portions thereof correspond to each other in circumferential direction and are different from each other in that they change gradually in an axial direction. Respective constructions thereof are only different from each other in that the diameter thereof becomes slightly larger toward the downward forming roll (it is preferable that a diameter of an outer periphery of the downward forming roll is made larger than a diameter of an outer periphery of the preceding forming roll by 0.3% to 1.0%), and identical with each other in the others. Accordingly, the construction of the forming roll will be explained with reference to the first forming rolls 23-1.

Figure 8:
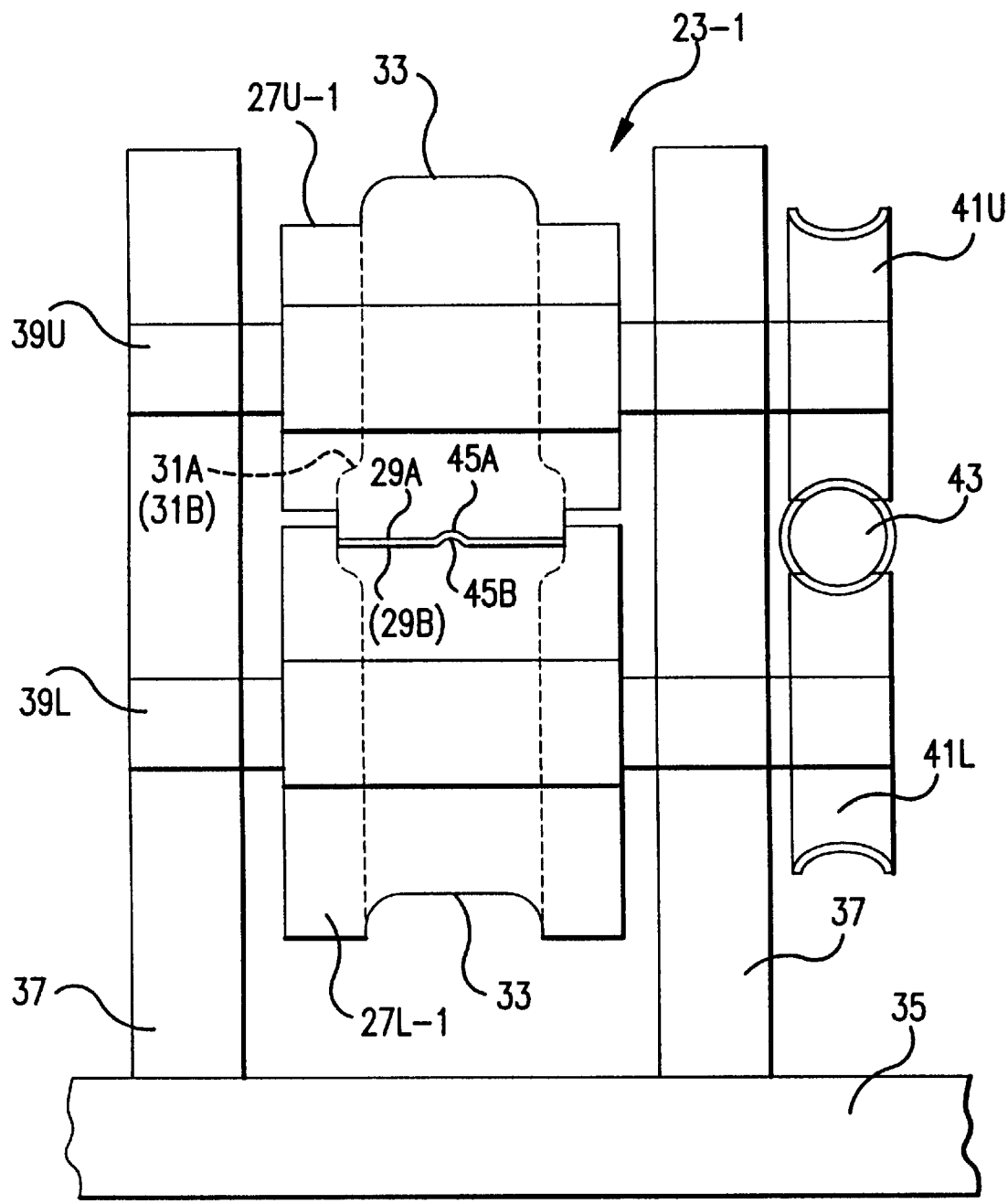
FIG. 8 is an explanatory sectional view showing a forming roll conceptually.

Referring to FIG. 8 which shows the construction of the forming roll conceptually, the upper and lower rolls 27U-1, 27L-1 of the forming rolls 23-1 are attached unitedly to the upper and lower rotating shafts 39U, 39L supported rotatably on roll supporting stands 37.

Worm wheels 41U, 41L of the same diameter are connected to one end side of the upper and lower rotating shafts 39U, 39L and are meshed with a common worm gear 43.

Accordingly, when the worm gear 43 rotates, the upper and lower worm wheels 41U, 41L rotate in opposite directions, respectively.

The construction shown in FIG. 8 is a construction shown conceptually. In a practical manner, the upper and lower rotating shafts 39U, 39L are supported on a bearing block which is supported adjustably upward and downward on the roll supporting stands 37. Also, one end position of the upper and lower rotating shafts 39U, 39L is connected to separate upper and lower rotating shafts having the upper and lower worm wheels 41U, 41L through a universal joint and a coupling, etc.

By adopting such a construction, the forming rolls 23-1, 23-2, . . . can be removed and become changeable, so that the above mentioned bumper enforcement and the roof rack can be produced, and the producing apparatus can be used widely.

Figure 9:
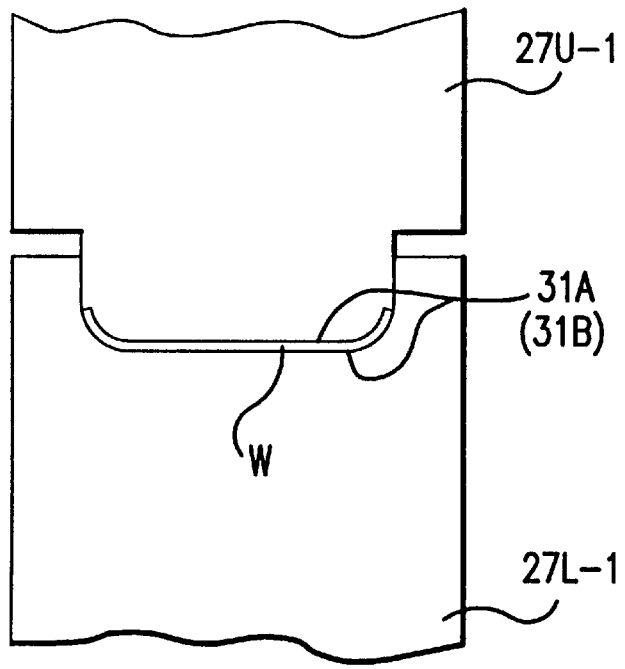
FIG. 9 is an explanatory partial sectional view of the forming roll of FIG. 8.
Figure 10:
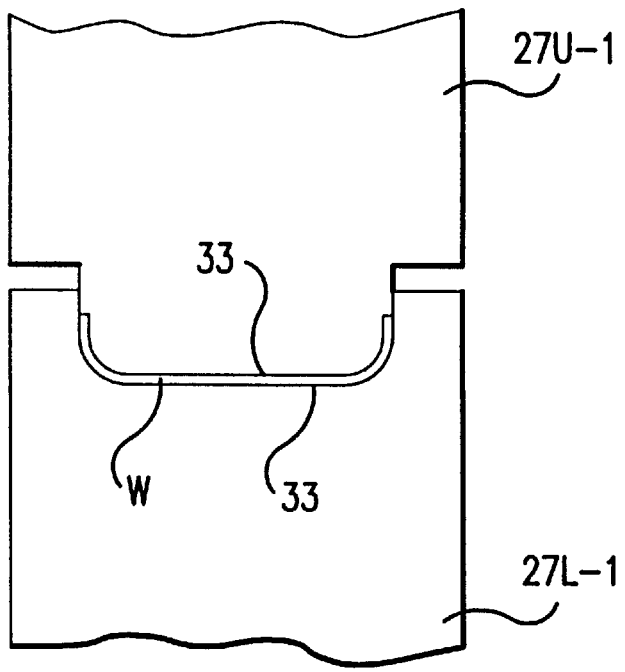
FIG. 10 is another explanatory sectional view of the forming roll of FIG. 8.
Figure 11:
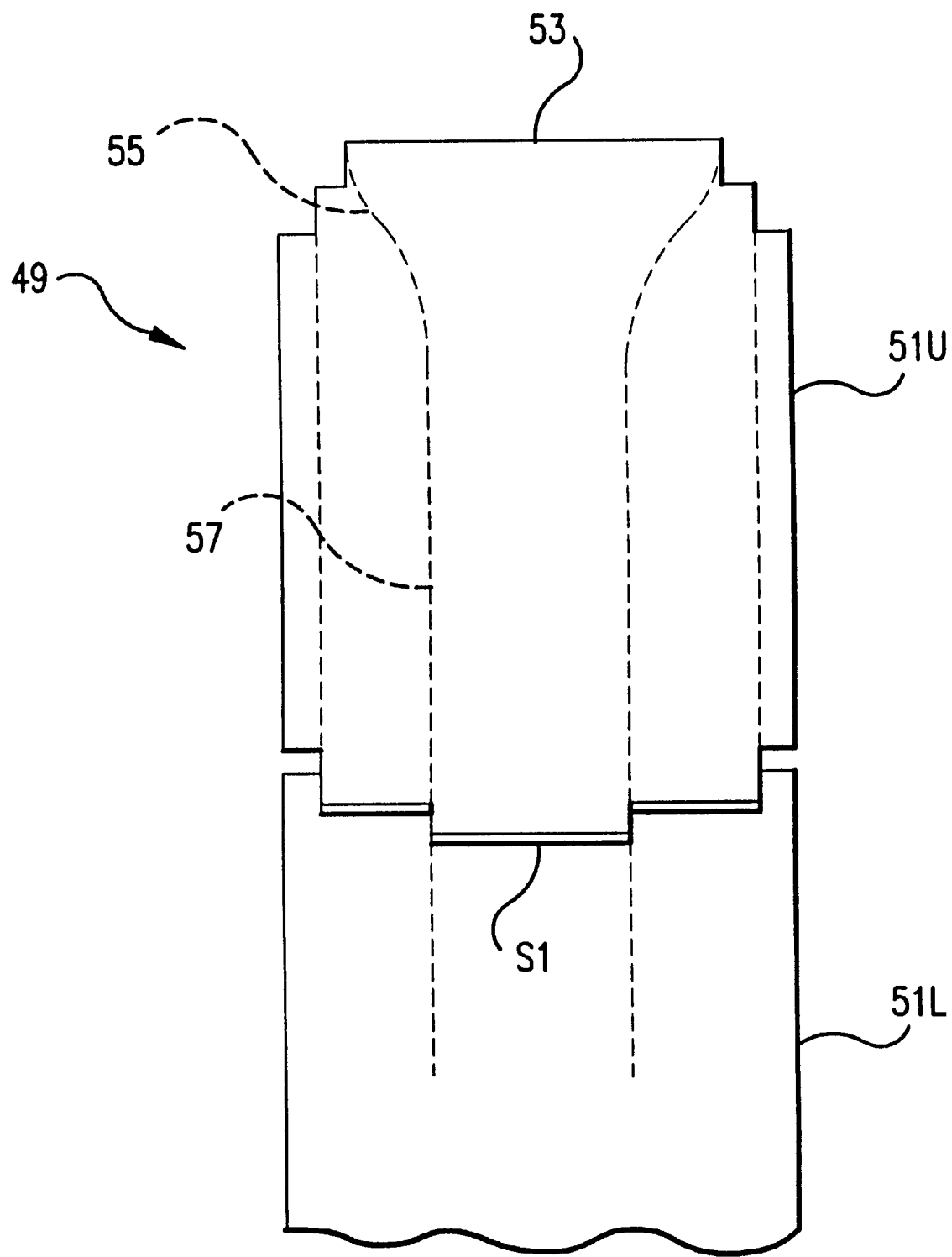
FIG. 11 is an explanatory sectional view of a slitter roll.

FIGS. 8, 9 and 10 are sectional views in which the upper and lower rolls 27U-1, 27L-1 rotate and are in a meshing state at different positions, and, as shown in FIGS. 8, 9 and 10, the terminal attaching portion forming-working portions 29A, 29B, lateral sectional shape changing portion forming-working portions 31A, 31B and a central main body forming-working portion 33 for bending forming-working the flat plate W into the door beam 1, are formed on the upper and lower rolls 27U-1, 27L-1 at the forming rolls 23-1 so as to form concavo-convex pairs. On the terminal attaching portion forming-working portions 29A, 29B are formed rib forming-working portions 45A, 45B (See FIG. 7) forming the ribs 9A, 9B. In the upper and lower rolls 27U-1, 27L-1, if the working portions of 29A, 29B and 31A, 31B are produced so as to fit inside the other, then they can be detachable from the roll main body such that it is easy to deal with a change in shape of the product.

Moreover, in FIGS. 6(*a*) and 6(*b*), the patterns of the respective forming-working portions are differentiated in order to understand easily the difference of phase angles of the respective forming rolls 23-1, . . . , 23-n.

As described above, the flat plate W is bending-worked on the door beam 1 continuously along the longitudinal direction by the roll-forming, and the forming rolls are formed greater in diameter toward the downstream forming roll according to the elongation of the flat plate W at the time of the roll-forming. Accordingly, as shown in FIG. 6(*a*) and 6(*b*), when respective distances of the respective forming rolls 23-1, . . . , 23-n are L, the difference of the phase angle of the downstream forming roll to the upstream forming roll (for example, the difference of the phase angle of the forming-working portion 29A at the downstream forming roll to the forming-working portion 29A at the upper forming roll) is $\Theta$, and the roll diameter of the downstream forming roll is d, the arrangement is ensured in such a manner that the distance L is represented on the relation of $L = \pi d \Theta / 360°$. Incidentally, the distance L is usually constant in the producing apparatus, and in this case, the phase angle of the downstream forming roll is shifted by the angle $\Theta$ so as to satisfy the above mentioned relational equation, and then the attaching is realized.

A strip material S1 is used as a plate material for forming the door beam 1. However, in this embodiment, an uncoiler 47 around which the strip member material S1 is wound is arranged at an upstream side of the forming rolls 23-1. In addition to this, in this embodiment, a slitter roll (changing width forming-working apparatus) 49 for forming the strip material S1 at a desired width that changes along the longitudinal direction.

In the apparatus added with the changing width forming-working apparatus, the construction of the door beam thereof is identical with that of the door beam shown in FIGS. 1 and 4. However, different from FIGS. 1 and 4, when the width of the terminal attaching portions is greater than $\pi D$, this apparatus is used for producing the door beam having the wider terminal portions.

The above mentioned slitter roll 49 comprises an upper roll 51U and a lower roll 51L. The diameters of the upper and lower rolls 51U and 51L are formed so as to be equal to the diameters of the upper and lower rolls 27U-1, 27L-1.

On circumferential faces of the upper and lower rolls 51U and 51L are formed a terminal attaching portion slit working portion 53 for conducting a slitting work of the strip material S1 corresponding to the width of the terminal attaching portions 7A, 7B of the door beam 1, a lateral sectional shape changing portion slit working portion 55 for conducting a slitting work of the strip material S1 corresponding to the developed width of the lateral sectional shape changing portions 5A, 5B, and a center main body portion slit working portion 57 for conducting a slitting work corresponding to the developed width of the center main body portion 3.

The terminal attaching portion slit working portion 53 is provided with punches 59A and 59B (See FIG. 6) protruding from the circumferential face outward in the radial direction for working the positioning holes 11A1, 11A2; 11B1, 11B2, and with die holes (not shown). Moreover, the distance between the slitter roll 49 and the first forming roll 23-1 is represented by the above mentioned relational equation of $L = \pi d \Theta / 360°$.

The above mentioned slitter roll 49 aims to slitting-work the width of the strip material S1 corresponding to the developed shape of the door beam 1 and to work the positioning holes 11A1, 11A2; 11B1, 11B2. Therefore, the slitter roll 49 can be omitted in a case where the slitting-working of the strip material S1 and the working of the positioning holes are unnecessary, such as in a case where preworked (e.g., cut at a desired length and a changing width) elongated rectangular plate material is fed to the first forming rolls 23-1 of a group of the forming rolls.

Incidentally, in a case where the elongated rectangular plate-like strip is transferred and fed, the uncoiler 47 and a cutting apparatus 71 can be omitted.

Figure 12:
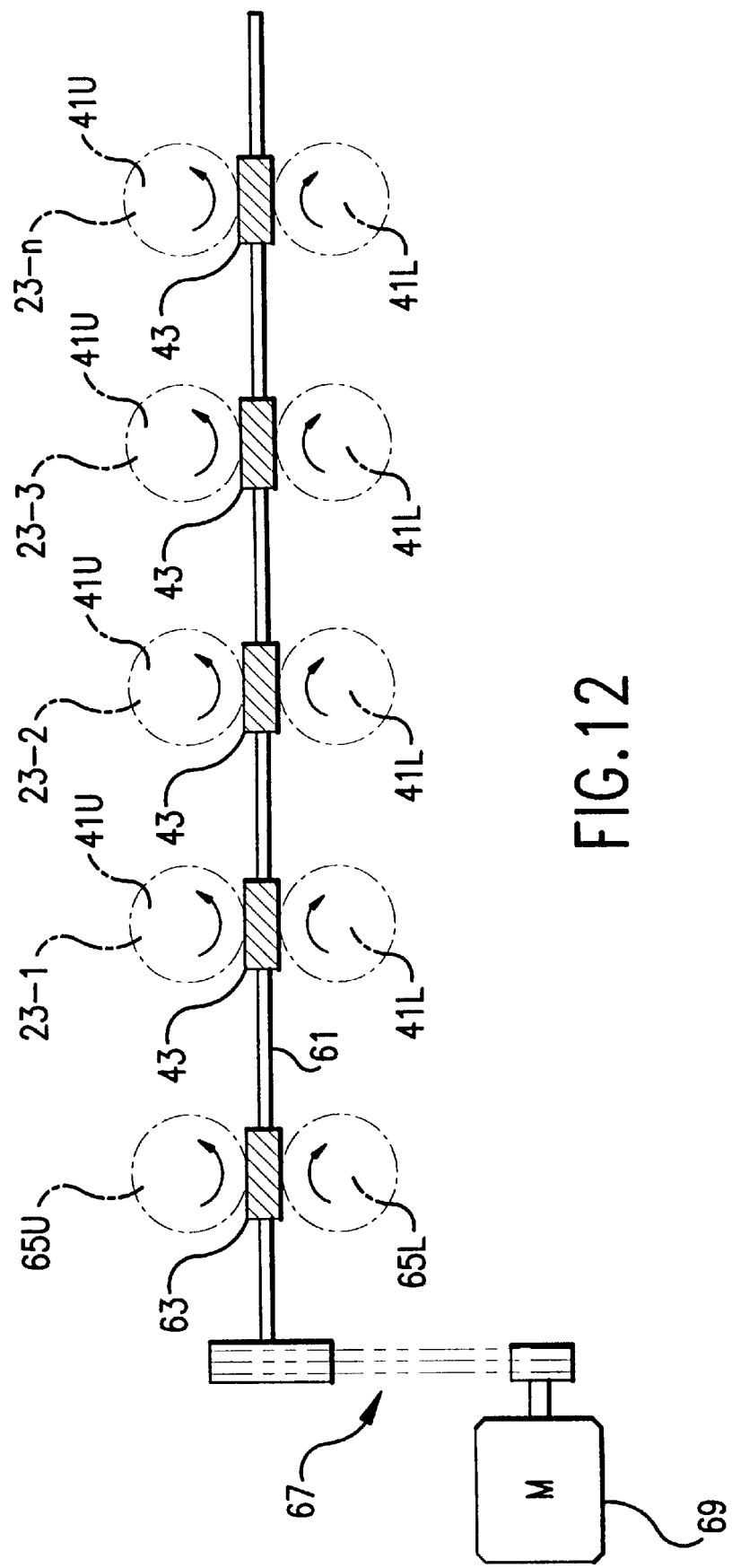
FIG. 12 is an explanatory schematic view showing a construction of a driving system for the production apparatus.
Figure 13:
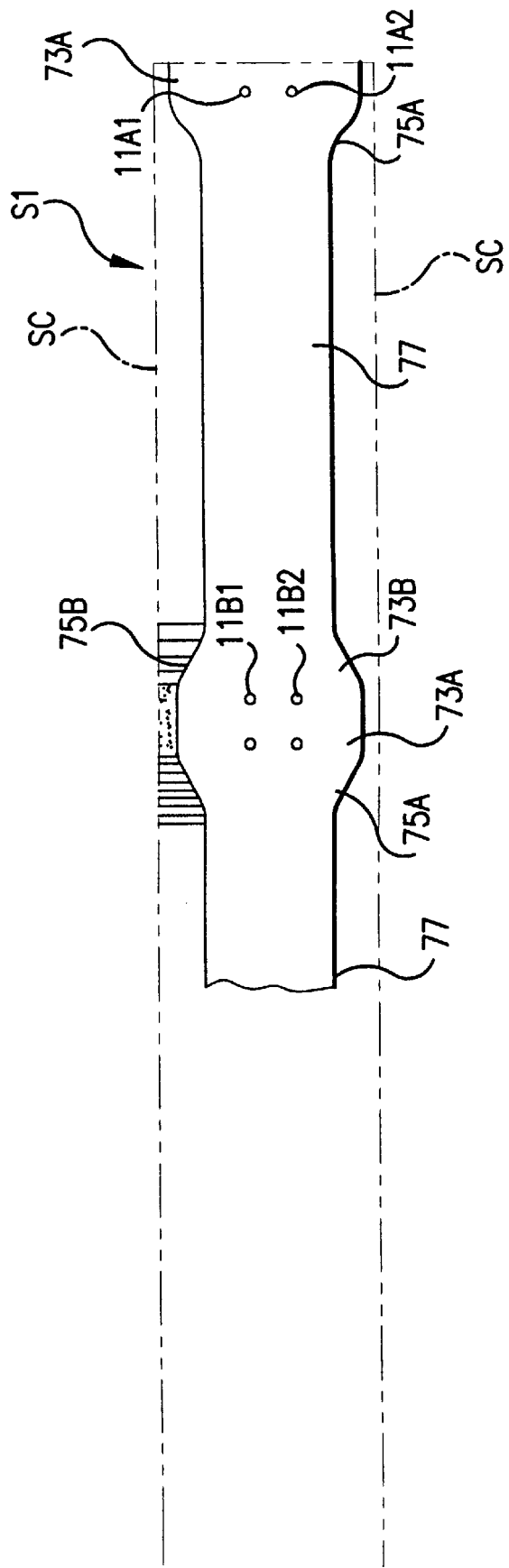
FIG. 13 is an explanatory view of a piece of strip material being processed through the slitter roll.
Figure 14B:
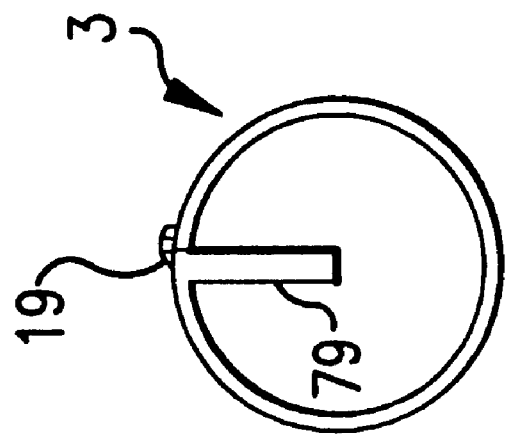
FIGS. 14(*a*), 14(*b*), 14(*c*) and 14(*d*) are explanatory sectional views showing additional embodiments of the center main body portion of the door beam.
Figure 14A:
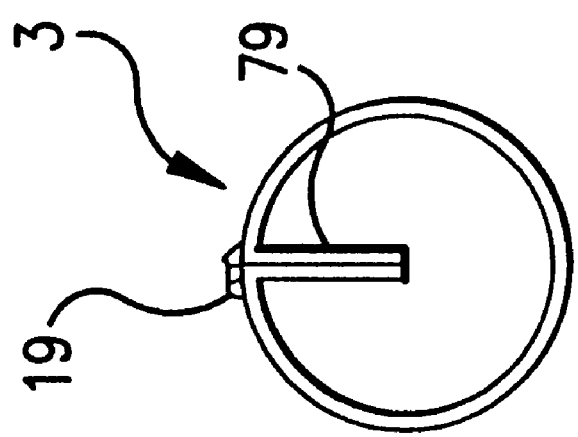
Figure 14D:
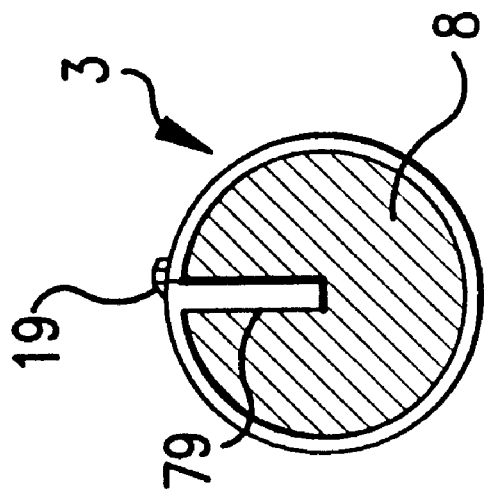
Figure 14C:
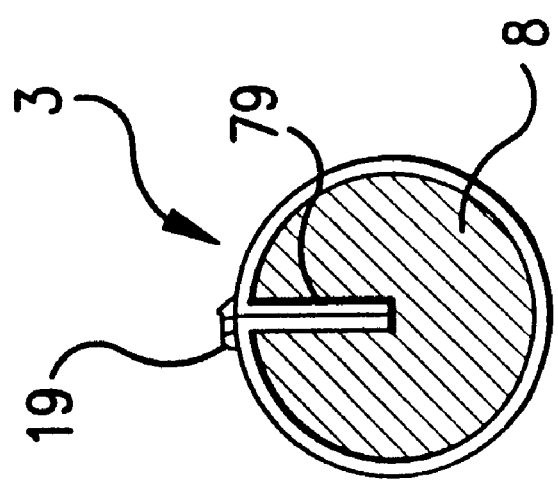

As shown in FIG. 12, a worm gear 63 is disposed on a driving shaft 61 provided with respective worm gears 43 for rotating each of the upper and lower worm wheels 41U and 41L in order to rotate and drive the slitter roll 49 and the forming rolls 23-1, . . . , 23-n of a group of the forming rolls. The upper and lower worm wheels 65U and 65L linked with the upper and lower rolls 51U and 51L on the slitter roll 49 are meshed with the worm gear 63. The driving shaft 61 is linked with the driving motor 69 through a transmitting mechanism 67 comprising a pulley and belt and the like.

Accordingly, when the driving motor 69 is rotated and driven, the slitter roll 49 and the respective forming rolls 23-1, . . . , 23-n are rotated in the reverse direction at the pair of upper and lower rolls, and rotated simultaneously in the same direction and at a constant speed at the adjacent rolls with respect to the upstream and downstream directions.

The welding apparatus 25 disposed at a downstream side of a group of the forming rolls aims to form the welded portion 19 by welding the joint portion of the door beam 1 which is forming-worked by a group of the forming rolls, and comprises, for example, a MIG welder or the like.

This welding apparatus 25 detects a changing point of the center main body portion 3 from the end portion 7E of the door beam 1 to which a group of the forming rolls are transferred at a constant speed, or the positioning holes 11A1, 11A2; 11B1, 11B2, or the lateral sectional shape changing portions 5A, 5B, by a suitable sensor such as a magnetic sensor, a photo sensor or an image sensor, and starts welding after the set time elapsed or at the same time of detecting, to thereby weld the joint portion of the center main body 3 over an suitable range thereof.

Moreover, the joint portion of the center main body 3 can be welded all over the length thereof or at intervals by controlling suitably the welding time of the welding apparatus corresponding to the feed speed of the door beam 1.

Referring to FIG. 6 again, a running and cutting off apparatus 71 is disposed downstream the welding apparatus 25.

The running and cutting off apparatus 71 becomes necessary when the strip material is continuous. The running and cutting off apparatus 71, cuts the door beam 1 at a boarder portion of the terminal attaching portions 7A, 7B while moving in the transferred direction of the door beam 1 synchronously after the joint portion is welded by the welding machine 25.

It is preferable that the running and cutting off apparatus 71 is constituted by a shearing machine provided with upper and lower shearing cutters or a cutting machine provided with a disk cutter. As a system moving in synchronization with the movement of the door beam 1, it is adapted to move the running and cutting off apparatus reciprocatingly in the moving direction of the door beam 1 at the same speed thereof by driving a servo motor, to detect the change of the door beam 1 transferred through the welding apparatus 25, from the center main body 3 to the lateral sectional shape changing portion 5B, or the rib 9B of the terminal attaching portion 7B and the positioning holes 11B1, 11B2 by suitable sensors such as a photo sensor and an image sensor, and simultaneously to move the running and cutting off apparatus in the moving direction of the door beam 1, and to cut the door beam 1 when the cutter reaches the border position of the terminal attaching portions 7A, 7B and the door beam 1 and the running and cutting off apparatus become identical in moving speed with each other. Moreover, as described above, in a case where the elongated rectangular flat plate cut at a predetermined length is used as a plate material for forming-working the door beam 1, the running and cutting off apparatus can be omitted.

In the above mentioned construction, the strip material S1 unwound from the uncoiler 47 is transferred and fed to between the upper and lower rolls 51U and 51L of the slitter roll 49, and then the terminal attaching portion corresponding portion 73A, 73B corresponding to the terminal attaching portions 7A, 7B, and the positioning holes 11A1, 11A2; 11B1, 11B2 are worked by the terminal attaching portion slit working portion 53 of the upper and lower rolls 51U, 51L.

Also, the lateral sectional shape changing portion corresponding portion 75A, 75B corresponding to the lateral sectional shape changing portion 5A, 5B is slitting-worked by the lateral sectional shape changing portion 55 of the upper and lower rolls 51U, 51L, and the center main body corresponding portion 77 is slitting-worked by the center main body portion slitting working portion 57.

And, a scrap SC caused due to the slitting-working at the slitter roll 49 is discharged outward.

The strip material S2 which is slitting-worked at the slitter roll 49 is transferred and fed in such a manner that the terminal attaching portion corresponding portion 73A of the strip material S2 coincides with the terminal attaching portion forming-working portion 29A at the first forming roll 23-1.

And, there are conducted a first step of bending forming-working along the longitudinal direction of the terminal attaching portion forming-working portions 29A, 29B of the upper and lower rolls 27U-1, 27L-1 at the first forming roll 23-1, the terminal attaching portion corresponding portions 73A, 73B of the strip material S2 corresponding to the lateral sectional shape changing portion forming-working portions 31A, 31B and the center main body forming-working portion 33, and the lateral sectional shape changing portion corresponding portions 75A, 75B and the center main body corresponding portion 77.

The strip material S3 on which the forming-working of the first step has been conducted through the first forming roll 23-1 is transferred and fed to the second forming roll 23-2, and then the strip material is subjected to the bending forming-working of the second step into a more nearly final shape of the door beam 1 by the upper and lower rolls 27U-2, 27L-2 at the second forming roll 23-2.

That is, the strip material S1 is slitting-worked by the slitter roll 49, after that, it is subjected to the n-th step of forming-working by the first, . . . , the n-th forming rolls 23-1, . . . , 23-n at a group of forming rolls to be formed in a shape of the product, and then transferred and fed the welding apparatus 25.

The joint portions of the widthwise side edges of the strip materials when the center main body portion 3 of the door beam 1 is formed in the pipe-like manner are welded at the welding apparatus 25. After that, the strip material is transferred and fed to the running and cutting off apparatus 71, then the border position of the terminal attaching portions 7B and 7A which are in the connected state (intermediate position when the shapes of the terminal attaching positions 7A and 7B are identical with and symmetrical to each other) are cut at the running and cutting off apparatus 71, that is, cut into the door beams 1 each having a predetermined length.

That is, according to this embodiment, the door beams 1 each having a predetermined dimension can be roll-formed continuously from the strip material wound in the coil-like manner.

In the above mentioned embodiment, the explanation is done assuming that the door beams 1 are formed by using the forming rolls 23-1, 23-2, 23-3, . . . , 23-n forming pairs with respect to the upward and downward directions. However, when it is desired that the length of the line of the producing apparatus be shortened, e.g., due to space restrictions of the factory, it is preferable to provide a side roll SR as an auxiliary forming roll apparatus at predetermined positions (from downstream of the forming roll 23-3 is shown in this embodiment, preferably, downstream of each respective forming rolls 23-1, 23-2, 23-3, . . . , 23-n).

Moreover, the above mentioned term of auxiliary does not mean an auxiliary forming, but it is used in order to distinguish it from the forming roll.

Figure 18:
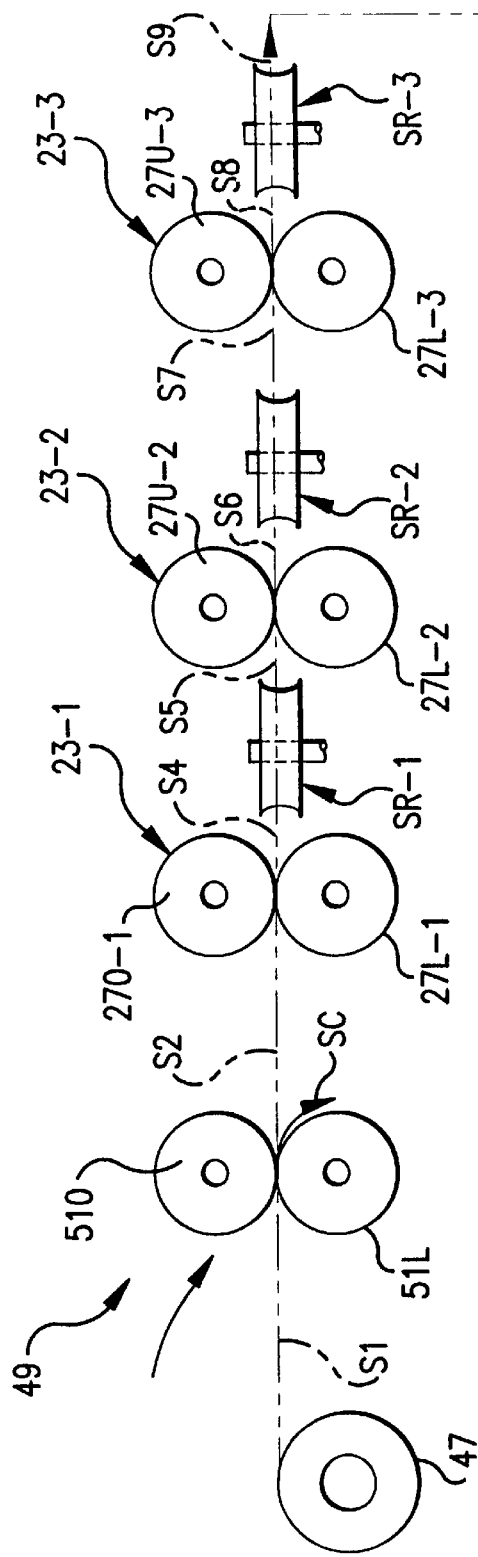
FIG. 18 is an explanatory view similar to FIGS. 6(*a*) and 6(*b*) showing locations of side rolls according to an alternative embodiment.
Figure 18:
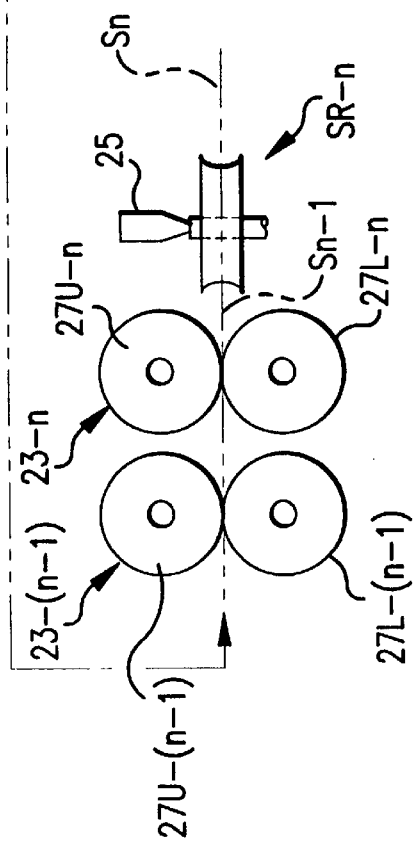

In FIGS. 6(a) and 6(b), the side roll SR is shown in only the position before the last succeeding forming roll 23-n (for the purposes of clarity). In an alternative embodiment as shown in FIG. 18, however, plural side rolls SR-1, SR-2, SR-3, . . . , SR-(n−1) and SR-n are disposed downstream of each of the forming rolls 23-1, 23-2, 23-3, . . . , and 23-n. The last side roll SR-n is preferably disposed directly adjacent the welding apparatus 25 so as to ensure the elongated member is properly secured in the desired shape at the point of welding.

Figure 17A:
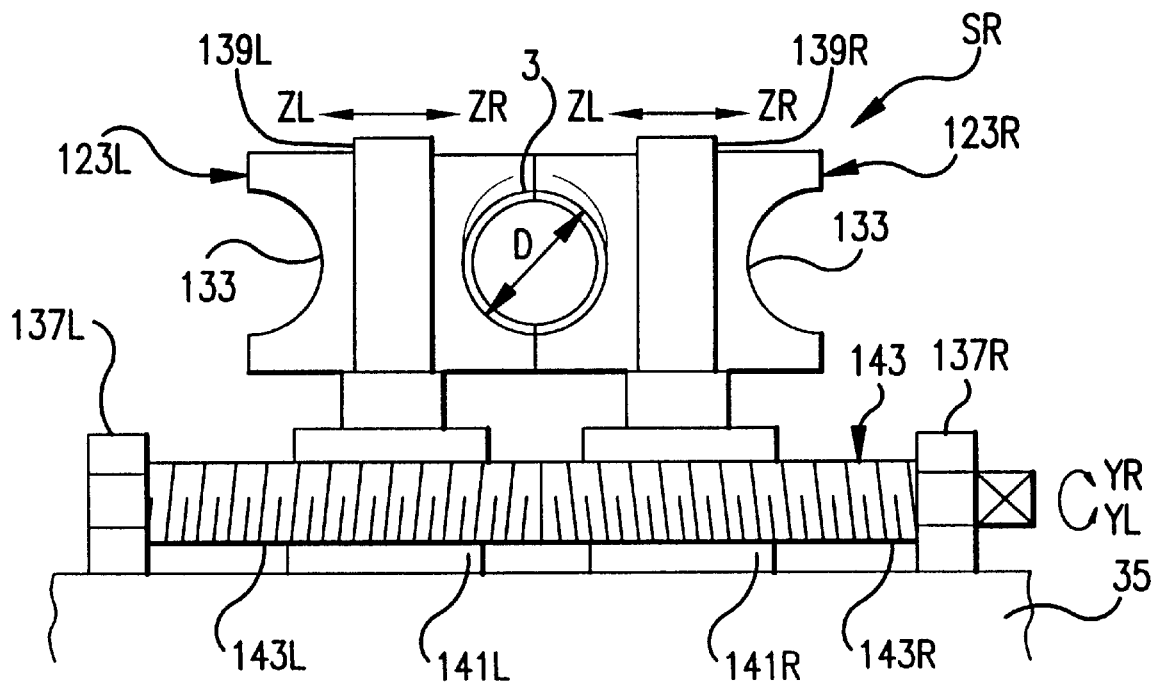
FIGS. 17(*a*) and 17(*b*) are explanatory views showing an auxiliary roll-forming apparatus.
Figure 17B:
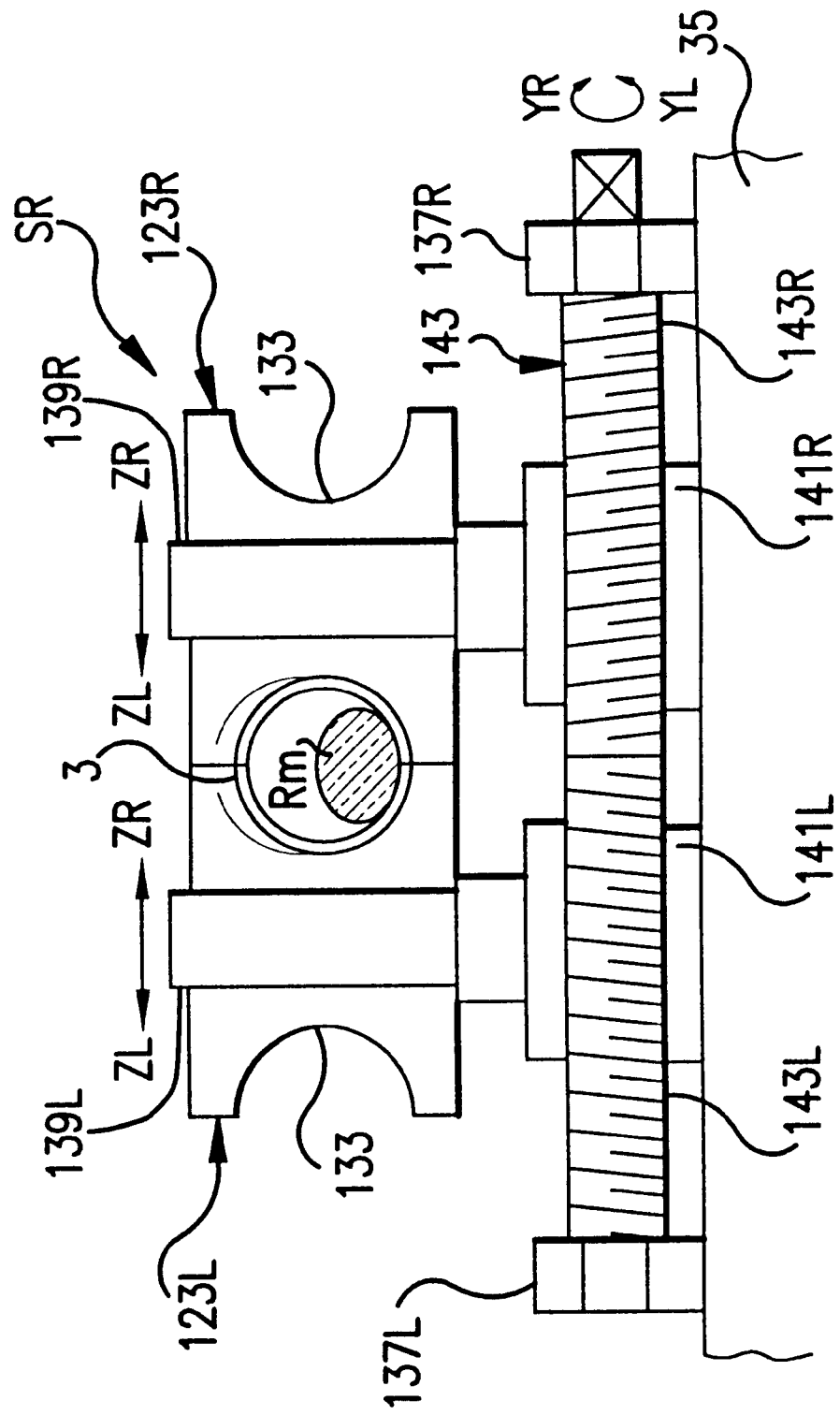

FIGS. 17(a) and 17(b) show a section of the side roll SR-1 of FIGS. 6(a) and 6(b) with respect to a plane perpendicular to a forming-working direction of the door beam to be formed. In FIGS. 17(a) and 17(b), the side roll is rotatably supported on respective supporting shafts 139L, 139R in which a pair of left and right side rolls 123L, 123R are disposed uprightly in a direction perpendicular to the shafts of the forming rolls 23-1, 23-n. Alternatively, the axis of the side roll may intersect the axes of the forming rolls at an angle other than 90°.

The supporting shafts 139L, 139R have slide blocks 141L, 141R at base portion sides thereof, respectively, the respective slide blocks having penetrating holes at center portions thereof, respectively, and female screws which are reverse to each other formed on these holes. These thread holes are meshed with thread bar 143 which is formed with male screws 143L, 143R which are reverse to each other, at both end sides thereof, and this thread bar 143 is supported by the supporting blocks 137L, 137R at both terminals thereof, and the supporting blocks 137L, 137R are fixed to the base 35 which is common to the base shown in FIG. 8. Also, one end of this thread bar is connected to the servo motor (not shown) and is controlled in rotating direction and rotating speed to be rotatable.

Forming faces 133, 133 for bending forming-working the strip member corresponding to the center main body portion 3 of the door beam into a pipe having an annular constant section, are formed on an outer periphery face of the side roll 123L, 123R, the shapes of the forming faces 133, 133 are constant all over the circumference thereof, different from the forming faces of the forming rolls 23-1, 23-2, . . . . Also, the diameter thereof may be no concern of the length of the formed door beam.

As for the operation of the side roll shown in FIGS. 6(a) and 6(b), when the strip material which is roll-formed into an intermediate shape by passing through a pair of the forming rolls 23-3 is transferred to a downstream side, the end portion 7E, or the positioning holes 11a1, 11A2 or the changing point from the lateral sectional shape changing portion 5A to the center main body portion 3 are detected by the above-described detector (not shown), and when the strip member of the portion corresponding to the starting end of the center main body portion 3 reaches the position of the side roll SR-1, the servo motor is operated and the thread bar 143 connected thereto is rotated and driven in a YR direction. Accordingly, the supporting shaft 139L is moved in a ZR direction and the supporting shaft 139R is moved in a ZL direction, bringing both shafts closer to a predetermined distance. As a result, the side rolls 123L, 123R contact the strip material to be rotated, and bending-work the strip material from the shape before working (shown by two dot chain lines in FIGS. 17(a) and 17(b)) into the pipe of circular cross-section which is more near to the final shape.

When the strip material of the portion corresponding to the terminal of the center main body portion 3 reaches to the position of the side roll SR, the tread bar 143 is rotated and driven in the reverse direction, that is the YL direction, so that the supporting shaft 139L in the ZL direction and 139R is moved in ZR direction to separate the both shafts at a predetermined point, and the portion corresponding to the flat plate-like portion.

The moving speed when the supporting shafts 139L, 139R are brought close and separated, is determined by the shape of the lateral sectional shape changing portions 5A and the transferring speed of the strip material.

Figure 19:
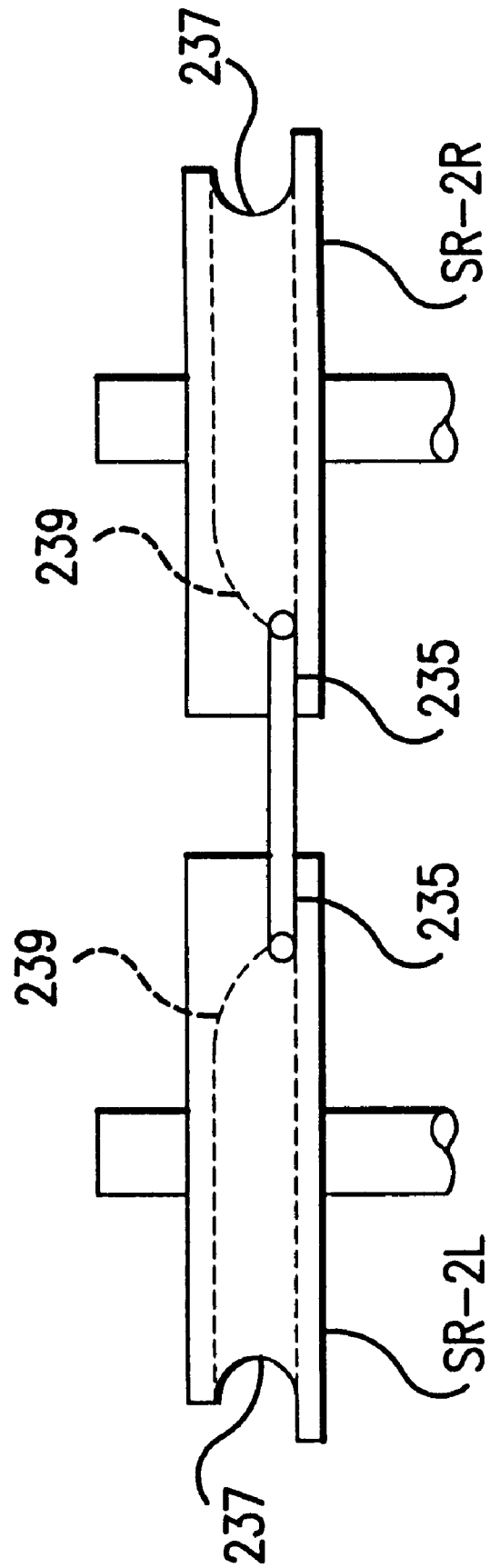
FIG. 19 is an explanatory view of a pair of the side rolls shown in FIG. 18.

The side rolls SR-1, SR-2, SR-3, . . . , SR-(n−1) and SR-n of FIG. 18 can be used in conjunction with or in substitution for the side roll of FIGS. 6(a) and 6(b). Because the side rolls of FIG. 18 are used earlier in the forming process than the side roll of FIGS. 6(a) and 6(b), the side rolls of FIG. 18 include sections corresponding to each portion of the product and are driven at the same rate and by the same apparatus as the forming rolls 23-1, 23-2, 23-3, . . . , and 23-n. Therefore, as shown in FIG. 19 for the second side roll SR-2 of FIG. 18, each of the left side roll SR-2L and right side roll SR-2R members includes: corresponding attaching portion forming-working portions 235 for forming-working portions corresponding to the terminal attaching portions 7A, 7B into a flat plate having ribs 9A, 9B; lateral sectional shape changing portion forming-working portions 239 for forming-working portions corresponding to the lateral sectional shape changing portions such that the lateral sectional shape changes gradually so as to connect the terminal attaching portions 7A, 7B and the center main body portion 3 by a smooth curved face; and center main body portion forming-working portions 237 for forming-working a portion corresponding to the center main body portion 3 into a pipe having a constant annular lateral section.

Similar to the succeeding forming rolls described above, the forming-working portions 235, 239 and 237 are the same in circumferential length for each of the side rolls SR-1, SR-2, SR-3, . . . , SR-(n−1) and SR-n, but change slightly in the radial dimension corresponding to the developing shape of the door beam 1 being formed. Depending on the location of a particular side roll in the overall process, any of the forming-working portions 235, 239, 237 of the side roll can be configured to stabilize and guide, rather than to form, the corresponding portion of the door beam 1 being processed through the side roll. In addition, the side rolls preferably increase in diameter to a slight extent (about 0.01% to 0.1%) in the downstream direction to produce a slight tension on the strip being processed, thereby elongating the strip slightly to prevent buckling and the like. The side rolls can be positioned to apply a second force to the product at an angle with respect to the first force applied by the forming rolls.

Figure 20:
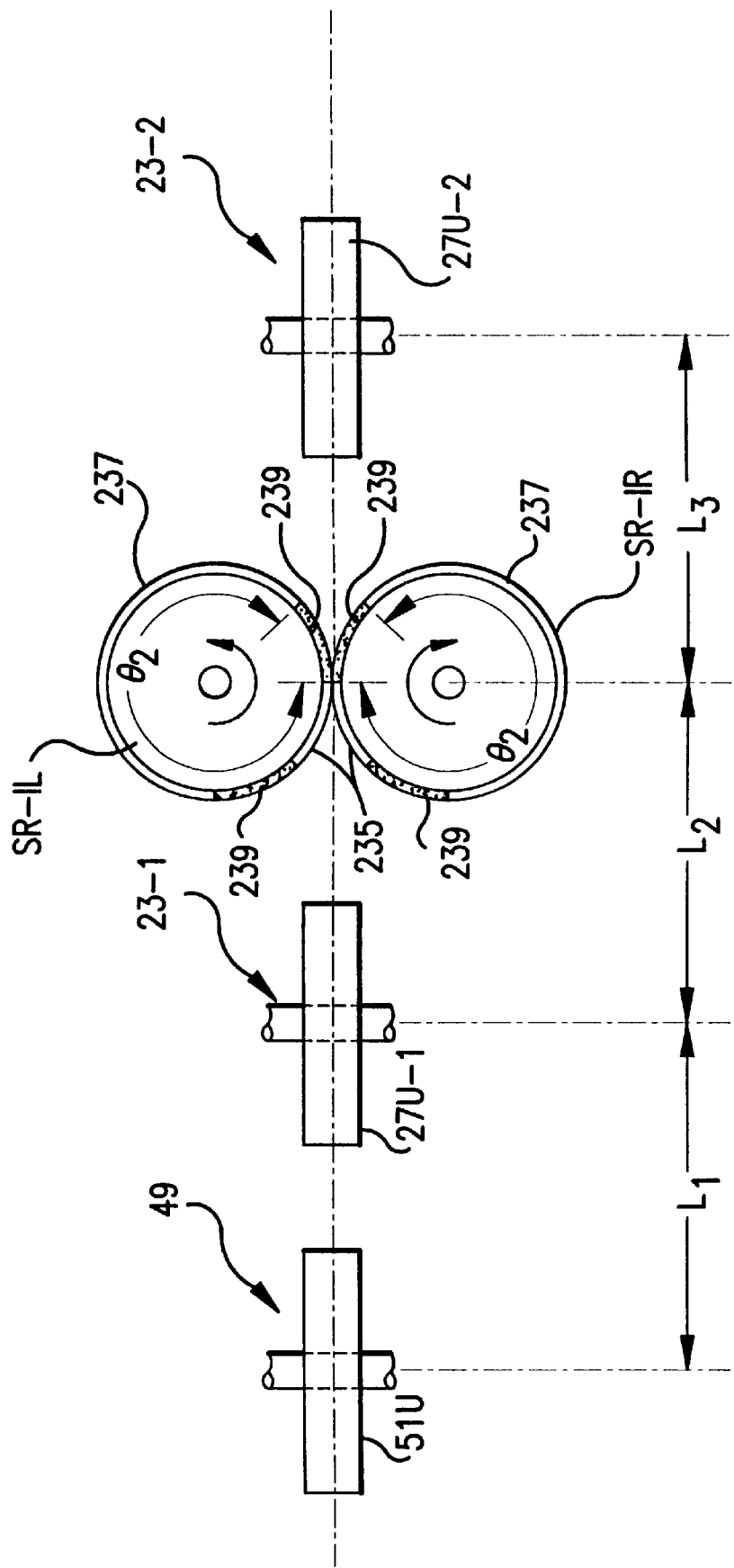
FIG. 20 is a partial top explanatory view of the embodiment shown in FIG. 18.

As shown in FIG. 20 for an embodiment that includes plural side rolls, equal distances $L_1$, $L_2$ and $L_3$ separate the slitter roll pair 49 from the first forming roll pair 23-1, the first forming roll pair 23-1 from the first side roll pair SR-1, the first side roll pair SR-1 from the second forming roll pair 23-2, and so on in the downstream direction. Each distance $L_1$, $L_2$ and $L_3$ is set such that the rotational phase difference is given by the formula $\Theta = (L \times 360°)/(d \times \pi)$. Therefore, $\Theta_1 = (L_1 \times 360°)/(d \times \pi)$, $\Theta_2 = ((L_1 + L_2) \times 360°)/(d \times \pi)$, and $\Theta_3 = ((L_1 + L_2 + L_3) \times 360°)/(d \times \pi)$.

Also, the present invention is not limited to the above mentioned embodiment, and can be conducted by the other construction which are modified suitably.

That is, in another embodiment of the product, the construction of the center main body portion 3 in the door beam 1, as shown in FIGS. 14(a), 14(b), 14(c) and 14(d), can be made into the construction in which the reinforcement rib 79 protruding inward is disposed on the joint portion formed in to the pipe-like manner. As shown, the center main body portion 3 of both FIGS. 1(a) and 1(b) can be configured to include the reinforcement rib 79.

In this case, assuming that the diameter of the pipe-like portion is D, the terminal attaching portions 7A, 7B can be constructed wider in width than πD, and the bending strength of the center main body portion 3 can be improved.

Also, as shown in FIGS. 15(a) and 15(b), another embodiment of the production can be constructed such that rib members 81 comprising separate members are disposed in the center main body 3 formed in the pipe-like manner, and they are connected with each other by the welding portion 19.

According to this construction, a member of suitable material and sectional shape can be used as the rib member 81, and the bending strength of the center main body portion 3 can be further improved. In other words, the center main body portion 3 can be decreased in diameter while maintaining the strength thereof.

Figure 16:
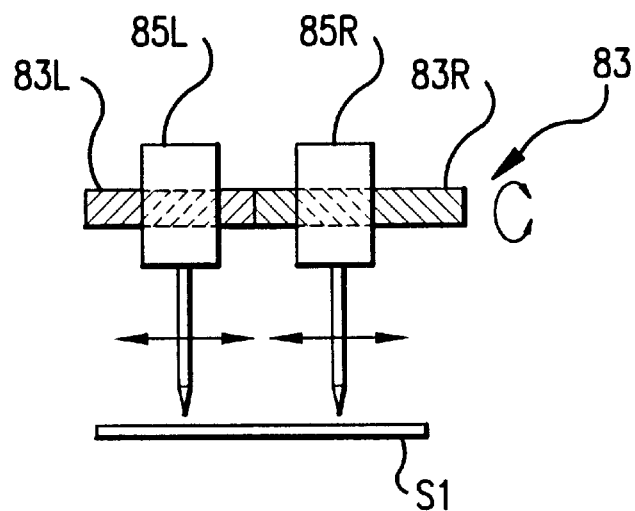
FIG. 16 is an explanatory view showing another embodiment of a changing width forming-working apparatus of a flat plate instead of a slitter roll.

Further, the above mentioned changing width forming means described in the embodiment of the producing apparatus can be constructed as shown in FIG. 16 instead of the slitter roll 49.

That is, it can be constructed such that a concentration heat energy beam working heads 85R and 85L such as a laser processing head are screw-fitted on a right thread 83R and a left thread 83L disposed symmetrically on a thread rod 83, and the thread rod 83 is rotated suitably according to the supplied amount of the strip material with respect to the longitudinal direction, thereby left and right working heads 85R and 85L can be adapted to be brought into closer and separated. Moreover, in this case, the changing width forming means is not always necessary to be arranged before the first forming roll apparatus 23-1, and it can be arranged after the forming rolls 23-2, 23-3.

In the above explanation, the door beam for use in the automobile is the representative example. However, when it is applied to the bumper reinforcement or the roof rack, a longitudinal axis of the elongated member is bent at a predetermined radius of curvature in such a manner that the terminal attaching portion including the lateral sectional shape changing portion forms an arc toward the chassis and that the joint portion 19 faces to the bending inner side, and it is preferable that this axial line bending working is conducted after the elongated member having a predetermined length is forming-worked.

Moreover, in the above mentioned explanation of the producing method and the apparatus of the embodiment, the explanation is done with respect to the method and the apparatus for producing one kind of the door beam as the elongated member. However, the present invention is not limited to this, and a plurality kinds of the door beam can be produced simultaneously as the occasion demands. For example, there can be produced simultaneously the door beam shown in FIGS. 1(*a*) and 1(*b*) for use in a front door, and a door beam for use in the rear door in which the essential construction is substantially identical to the door beam for use in the front door, but the center main body section is shorter.

In this case, any one of the diameters of respective upper and lower rolls 27U-1, 27L-1 of the first forming roll apparatus 23-1 shown in FIG. 6 is made larger than that of FIGS. 1(*a*) and 1(*b*), that is, it is enough that the diameter of both of the forming rolls is determined in such a manner that the outer circumferences thereof become identical with the length which is added with respect to the total length of the front door and the rear door. The outer circumference of the forming roll is divided into two regions (one region for a front, the other region for a rear) with respect to the circumferential direction. In the region for the front, the length of the region is that shown in FIG. 7, and in the other one region for the rear adjacent to the said region, the length of the region is substantially identical with that of FIG. 7, but the center main body portion forming working portion (reference numeral 33 in FIG. 7) is formed so as to become short. It goes without saying that the same steps are conducted for the succeeding forming roll apparatus after the corresponding second forming roll apparatuses.

In the producing apparatus provided with the constructed forming roll apparatus, the front door beam and the rear door beam are produced alternately while a one-to-one relation of number is maintained.

The above mentioned description is the producing apparatus and the producing method of two kinds of the elongated member which are different in the length of the center main body portion form each other, however, it is allowable that the shapes and the length of the lateral sectional shape changing portion and the other portion are differentiated, which is also applicable to at least three kinds of the elongated members which are different in shape and length from each other if the same processes are realized.

Figure 21:
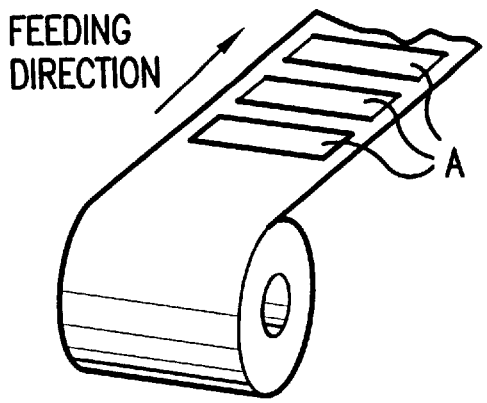
FIG. 21 is a perspective explanatory view of a roll of strip material configured for a conventional press-working process in which the strip material feeding direction is approximately perpendicular to the longitudinal axis of the press-formed elongated member.
Figure 22:
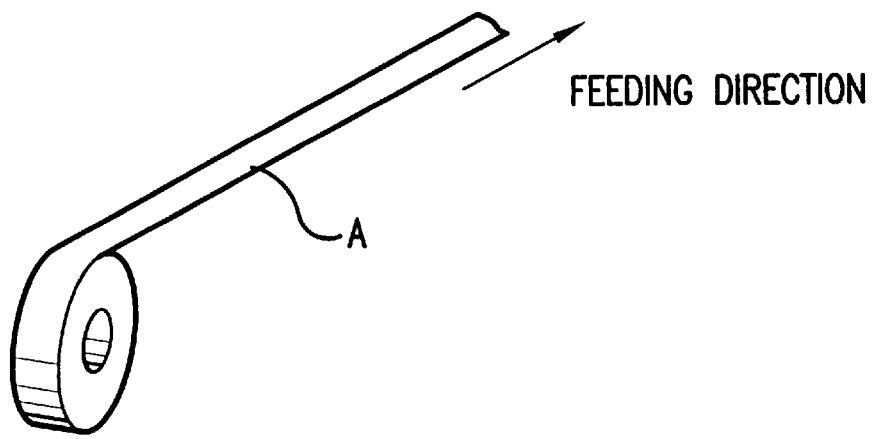
FIG. 22 is a perspective explanatory view of a roll of strip material configured for the roll forming process of the present invention in which the strip material feeding direction is parallel to the longitudinal axis of the roll-formed elongated member.
Figure 23:
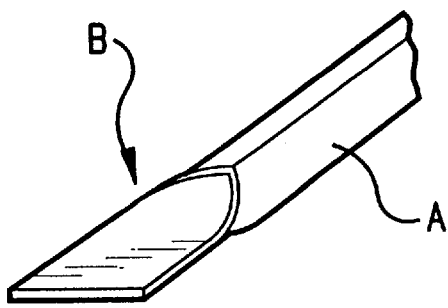
FIG. 23 is a partial perspective explanatory view of a conventional press-formed elongated member showing a deformed (stretched) transition portion resulting from the conventional press-working process.

In the roll-forming process of the present invention, the metal strip is fed in the same direction as the roll-forming direction (see FIG. 22). During roll forming of an elongated member A, the metal strip is stretched in the longitudinal direction of the elongated member A at a transition region B between the main body portion and the terminal portion (see FIG. 23). Therefore, the direction in which the metal strip is stretched is the same as the rolling direction in the case of roll-forming process, unlike the press-forming process in which the metal strip is stretched in a direction perpendicular to the press-forming direction (see FIG. 21).

When rolled metal strip material is used in a conventional press-working process, the elongation of the strip is slightly (i.e., typically several percent) higher in the feeding direction than in a direction perpendicular to the feeding direction. In other words, in the case of a high tension steel strip having a tensile strength on the order of 120 kgf/mm$^2$, when the steel strip has an elongation of 10% in the feeding direction, the elongation in the direction perpendicular to the feeding direction is about 7–8%. Due to this difference in elongation, in the transition region B which undergoes a significant elongation close to the critical elongation (see FIG. 23), occurrence of cracks and/or ruptures is less likely in the roll forming process, and more likely in the press-type process.

In addition, the press-forming process for the elongated member requires a trimming step in the final stage. As a result, only 80–90% of the supplied raw material is used in the final product. In contrast, the roll-forming process of the claimed invention allows use of nearly all the strip material.

Further, during production when changing the thickness of the metal strip slightly becomes necessary, the roll gap between the upper and lower rolls and/or between the opposite side rolls in the roll-forming apparatus can be adjusted easily. In contrast, the press-type process requires modification or replacement of dies.

In this specification, the term of first such as a first intermediate material, a first forming roll, a first forming roll apparatus, and a first shaft does not always mean the first, but means the preceding step in the explanation of the method, and the upstream side in the explanation of the apparatus.

Although this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. An apparatus for producing an elongated member having a main body portion with a substantially annular cross-section and terminal portions extending from end of the main body portion and having a different cross-section from the cross-section of the main body portion, the terminal portions including transition portions having a cross-section that changes continuously from the substantially annular cross-section to the different cross-section along a longitudinal axis from the main body portion to each of the terminal portions, the apparatus comprising:

a pair of first forming rolls rotatable in synchronization about parallel central axes and having circumferential faces with annular main body portion bending sections to form an intermediate of the main body portion with a substantially annular cross-section and adjacent transition portion bending sections configured to form a strip into an intermediate stage elongated member having the respective portions; and a pair of second forming rolls rotatable in synchronization about parallel central axes and having circumferential faces with annular main body portion bending sections to form the main body portion with a substantially annular cross-section and adjacent transition portion bending sections corresponding to the respective sections of the first forming rolls in circumferential length but having a different axial dimension to bend the intermediate stage elongated member such that the intermediate stage elongated member approaches a shape of the elongated member.

2. The apparatus of claim 1, wherein the first pair of forming rolls and the second pair of forming rolls rotate at a substantially equal speed.

3. The apparatus of claim 1, further comprising at least one pair of side rolls disposed downstream of at least the first forming rolls and rotatable about axes intersecting the central rotational axes of the first and second forming rolls, wherein the side rolls include contact sections engageable with the intermediate stage elongated member to guide and to further form the intermediate stage elongated member.

4. The apparatus of claim 3, wherein the axes of the side rolls are approximately perpendicular to the central rotational axes of the first and second forming rolls such that forces in perpendicular directions are exerted on the intermediate stage elongated member.

5. The apparatus of claim 3, wherein the at least one pair of side rolls is a first pair, further comprising at least one additional pair of side rolls disposed downstream of a succeeding pair of forming rolls.

6. The apparatus of claim 3, wherein the contact sections include annular bending sections to further form the main body portion of the intermediate stage elongated member.

7. The apparatus of claim 6, wherein the annular bending sections extend completely around each of the at least one pair of side rolls.

8. The apparatus of claim 6, wherein the contact sections include transition portion contact sections and terminal portion contact sections.

9. The apparatus of claim 1, wherein a diameter of the second forming rolls is slightly larger than a diameter of the first forming rolls.

10. The apparatus of claim 9, further comprising pairs of succeeding forming rolls disposed downstream of the second forming rolls, wherein a diameter of a first pair of succeeding forming rolls is greater than the diameter of the second forming rolls, and wherein the diameter of each subsequent pair of succeeding forming rolls is greater than a diameter of a preceding pair of succeeding forming rolls.

11. The apparatus of claim 1, wherein a rotational phase angle difference between a rotational phase angle of the first forming rolls and a rotational phase angle of the second forming rolls is $\Theta$, a diameter of the second forming rolls is d, and the second forming rolls are separated from the first forming rolls by a distance L such that $L=\pi d\Theta/360°$.

12. The apparatus of claim 1, further comprising a welder for welding side edges of the elongated member to each other along at least a portion of the main body portion.

13. The apparatus of claim 1, further comprising a separating apparatus for separating the elongated member from a next elongated member at a point between one terminal portion of the elongated member and an adjacent terminal portion of the next elongated member.

14. The apparatus of claim 1, further comprising a width changer disposed upstream of the first forming rolls for changing a width of the strip in a longitudinal direction.

15. The apparatus of claim 1, further comprising a bender for bending the elongated member along the longitudinal axis into an arc.

16. The apparatus of claim 1, further comprising a resin source located to supply foaming resin to an internal side of the intermediate stage elongated member before the main body portion is completely formed.

17. The apparatus of claim 1, wherein the first and second forming rolls include main body portion forming sections having a first radial bending dimension and transition portion forming sections having a second radial bending dimension distinct from the first radial bending dimension.

18. The apparatus of claim 17, wherein the pairs of first and second forming rolls each include a respective female roll and a respective mating male roll, each female roll including a circumferential groove to receive a corresponding circumferential protuberance of the respective mating male roll, and wherein a radial distance between each circumferential groove and a center of the respective female roll and a radial distance between each circumferential protuberance and a center of the respective male roll is nonuniform for points about the respective centers of each female and male roll.

19. An apparatus for forming an elongated member having a main body portion with a substantially annular cross-section and terminal portions extending from ends of the main body portion and having a different cross-section from the cross-section of the main body portion, the terminal portions including transition portions having a cross-section that changes continuously from the substantially annular cross-section to the different cross-section along a longitudinal axis from the main body portion to each of the terminal portions, the apparatus comprising:

first bending means for bending an elongated strip with circumferential faces of first forming rolls having parallel central rotational axes, the first bending means including first annular main body portion bending sections to form an intermediate of the main portion with a substantially annular cross-section and adjacent transition portion bending sections that partially bend the strip into an intermediate stage elongated member; and second bending means for bending the intermediate stage elongated member with circumferential faces of second forming rolls having parallel rotational axes, the second bending means including second annular main body portion bending sections to form the main portion with a substantially annular cross-section and adjacent second transition portion bending sections corresponding to the respective first sections of the first forming rolls in circumferential length but having a different axial dimension to bend the intermediate stage elongated member such that the intermediate stage elongated member approaches a shape of the elongated member.

\* \* \* \* \*